(12) United States Patent
Balmakhtar et al.

(10) Patent No.: US 11,665,533 B1
(45) Date of Patent: May 30, 2023

(54) SECURE DATA ANALYTICS SAMPLING WITHIN A 5G VIRTUAL SLICE

(71) Applicant: T-MOBILE INNOVATIONS LLC, Overland Park, KS (US)

(72) Inventors: Marouane Balmakhtar, Fairfax, VA (US); Lyle W. Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 255 days.

(21) Appl. No.: 17/138,650

(22) Filed: Dec. 30, 2020

(51) Int. Cl.
| | | |
|---|---|---|
| *H04W 12/03* | (2021.01) | |
| *H04L 9/00* | (2022.01) | |
| *H04L 12/46* | (2006.01) | |
| *H04L 9/06* | (2006.01) | |
| *H04L 45/302* | (2022.01) | |
| *H04W 84/04* | (2009.01) | |
| *H04L 41/0895* | (2022.01) | |

(52) U.S. Cl.
CPC ............. *H04W 12/03* (2021.01); *H04L 9/008* (2013.01); *H04L 9/0643* (2013.01); *H04L 12/4641* (2013.01); *H04L 45/306* (2013.01); *H04L 9/50* (2022.05); *H04L 41/0895* (2022.05); *H04L 2209/80* (2013.01); *H04W 84/042* (2013.01)

(58) Field of Classification Search
CPC ......... H04L 9/008; H04L 9/0643; H04L 9/50; H04L 12/4641; H04W 12/03
See application file for complete search history.

(56) References Cited

U.S. PATENT DOCUMENTS

| | | | |
|---|---|---|---|
| 10,172,009 B1* | 1/2019 | Altay | H04L 67/12 |
| 10,348,488 B1* | 7/2019 | Paczkowski | H04L 9/0643 |
| 10,764,160 B1* | 9/2020 | Shtrauch | G06F 16/275 |
| 11,520,749 B1* | 12/2022 | Balmakhtar | H04W 24/08 |
| 2014/0146673 A1* | 5/2014 | Parker | H04L 47/10 |
| | | | 370/252 |
| 2016/0308715 A1* | 10/2016 | Rasanen | H04L 67/10 |
| 2016/0352537 A1* | 12/2016 | Marquardt | H04L 12/4679 |
| 2017/0034050 A1* | 2/2017 | Sunavala | H04L 45/74 |
| 2019/0140971 A1* | 5/2019 | Guilbeault | H04L 41/40 |
| 2019/0168696 A1* | 6/2019 | Lau | H04L 67/12 |
| 2019/0170528 A1* | 6/2019 | Lau | H04L 67/306 |
| 2020/0099591 A1* | 3/2020 | Clarke | H04L 63/20 |
| 2020/0134207 A1* | 4/2020 | Doshi | H04L 9/0637 |

(Continued)

OTHER PUBLICATIONS

ETSI, "ETSI GS NFV 002 V1.2.1 (Dec. 2014)" [Online], Dec. 2014, [Retrieved on: Nov. 1, 2022], , Retrieved from: < https://www.etsi.org/deliver/etsi_gs/nfv/001_099/002/01.02.01_60/gs_nfv002v010201p.pdf > (Year: 2014).*

(Continued)

*Primary Examiner* — Eric W Shepperd

(57) ABSTRACT

A method of directing encrypted data transmitted wirelessly on a communication network comprising receiving encrypted data, by a managing application executing on a virtual network, from a user equipment (UE) operating on a mobile network. The managing application on the virtual network is coupled with an access node and deciphers a portion of the data encrypted with homomorphic encryption to determine a data characteristic. The managing application routes the encrypted data to a network location in response to the data characteristic of the encrypted data.

20 Claims, 17 Drawing Sheets

(56) References Cited

U.S. PATENT DOCUMENTS

| | | | | |
|---|---|---|---|---|
| 2020/0204444 | A1* | 6/2020 | Marquardt | H04L 41/0843 |
| 2020/0302434 | A1* | 9/2020 | Sethi | G06F 9/45558 |
| 2020/0358187 | A1* | 11/2020 | Tran | H01Q 3/46 |
| 2021/0368347 | A1* | 11/2021 | Wang | H04W 76/10 |
| 2022/0103985 | A1* | 3/2022 | Khasnabish | H04W 4/50 |
| 2022/0405750 | A1* | 12/2022 | Fallah | H04L 9/0825 |

OTHER PUBLICATIONS

Abdelwahab et al. "Network Function Virtualization in 5G" [Online] Apr. 19, 2016, IEEE Communications Magazine, [Retrieved on Nov. 5, 2022], Retrieved from: < https://ieeexplore.ieee.org/stamp/stamp.jsp?tp=&arnumber=7452271 > (Year: 2016).*

* cited by examiner

SECURE DATA ANALYTICS SAMPLING WITHIN A 5G VIRTUAL SLICE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Fifth Generation (5G) is the next generation cellular network that promises faster transmission of data, higher quality of service (QoS), and zero lag time. 5G also promises to enable home automation with internet of things (loT) devices and user equipment (UE) providing interactive sessions. 5G uses cloud computing to distribute mobile communication services across multiple virtual networks. These virtual networks use standard servers, off the shelf switches, and storage devices to create a virtual environment that can be scalable network services for mobile communication and business customers. 5G can connect loT and UE to home assistant applications in the cloud for interactive services. For example, a home assistant device can turn-on or turn-off the lights with a voice command. These loT devices and UEs can provide an immediate interactive session for some commands but must transmit and receive data from a central server to provide more complicated services such as interacting with another loT device to change the room temperature. Communication with a central server introduces latency, or a delay in service, based on the distance and status of the network connections from the loT devices or UEs to the central server. Mobile communication providers have turned to edge computing to lower the latency of the connections.

Edge computing places cloud computing closer to the UE to provide low latency and increases the QoS. Smaller cloud computing sites distribute the virtual environment of the cloud computing closer to the loT and UE. These smaller cloud computing sites can be micro-data centers placed regionally inside high density locations or placed strategically near a high usage customer. Edge computing can reduce the latency of the data communication during interactive sessions.

SUMMARY

In an embodiment, a method of directing encrypted data wirelessly transmitted on a communication network is disclosed. The method comprises receiving encrypted data, by a managing application executing on a virtual network function (VNF), according to a wireless communication protocol from a user equipment (UE), wherein the VNF is on a network slice, wherein the network slice is on a virtual network, and wherein the virtual network is coupled with an access node. The managing application determines a data characteristic of the encrypted data by deciphering a portion of the encrypted data, wherein the encrypted data comprises a header and a data set, wherein the header is encrypted with one of a fully homomorphic encryption (HE) or a non-fully HE, wherein the data set is one of unencrypted, fully HE, non-fully HE, or non-HE encrypted data set. The managing application routes the encrypted data to a network location within the communication network in response to the data characteristic of the encrypted data, whereby to reduce the network latency associated with network data traffic to a centralized server.

In another embodiment, a method of secure transfer of encrypted data within a communication network from a network node is disclosed. The method comprises receiving by an access node, by a transfer application executing on a virtual network function (VNF), encrypted data from a user equipment (UE) according to a wireless communication protocol, wherein the VNF is on a network slice, wherein the network slice is on a virtual network, and wherein the virtual network is coupled to the access node. The transfer application decrypts a portion of the encrypted data with an encryption key, wherein the portion of the encrypted data is one or more of a header, an identification, a set of data, or a portion of a set of data, wherein the portion of a set of data is one of a time bound segment or a set bound segment. The transfer application writes the portion of the unencrypted data to an application data set, wherein the application data set includes one or more of a database, a data file, an identity file, a data set, or a nonce. The transfer application determines a network response in response to analyzing the application data set, wherein the network response is an encrypted data destination and wherein the encrypted data destination is one or more of a receiving network slice, a remote server, a remote data store, a remote application, or a second UE. The transfer application encryptes the application data set with a second encryption key and assigns a hash filename to the application data set, wherein the hash filename is a hash of the application data set and wherein the transfer application hashes the application data set with a hash function. The transfer application writes an encrypted application data set with the hash filename to a distributed content storage server or a remote server. The transfer application writes a data record chain identity, a current data record, a current data hash, and a previous data hash into non-transitory memory on a network slice, wherein the current data record comprises the hash filename, the second encryption key, and a nonce, wherein the current data record hash is a hash of the current data record, wherein the previous data record hash is a hash of previous data record, and wherein the transfer application assigns the data record chain identity. The method further comprises notifying by the transfer application the encrypted data destination of the data record chain identity.

In yet another embodiment, a method of secure transfer of encrypted data from a first autonomous vehicle (AV) to a second AV within a communication network. The method comprises receiving via an access node by a transfer application executing on a virtual network function (VNF) encrypted data from a first autonomous vehicle (AV) according to a wireless communication protocol, wherein the VNF is on a network slice on a virtual network that is coupled to the access node. The transfer application analyzes a portion of the encrypted data, wherein the portion of the encrypted data is one or more of a header, an identification, a set of data, or a portion of a set of data, wherein the portion of a set of data is a time bound segment and wherein the portion of the encrypted data is encrypted with one of fully homomorphic encryption (HE) or non-fully HE. The transfer application determines an encrypted data destination in response to analyzing the portion of the encrypted data, wherein the encrypted data destination is one of a receiving network slice, a remote server, a remote data store, a remote application, or a second AV. The method continues by transferring data routing by the transfer application to a remote transfer application executing on a core network slice in response to determining the encrypted data destination is a remote server or remote data store, thereby reducing the latency of the data traffic of the access node, wherein the core network slice is centrally located. The method continues by transferring data routing by the transfer application to a second transfer application located on network slice communicatively coupled with the access node in response to the encrypted data destination located on a network slice, whereby a latency of the data traffic of the access node is reduced. The method further comprises routing the encrypted data, by the transfer application, to the second AV in response to the encrypted data destination being the second AV.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
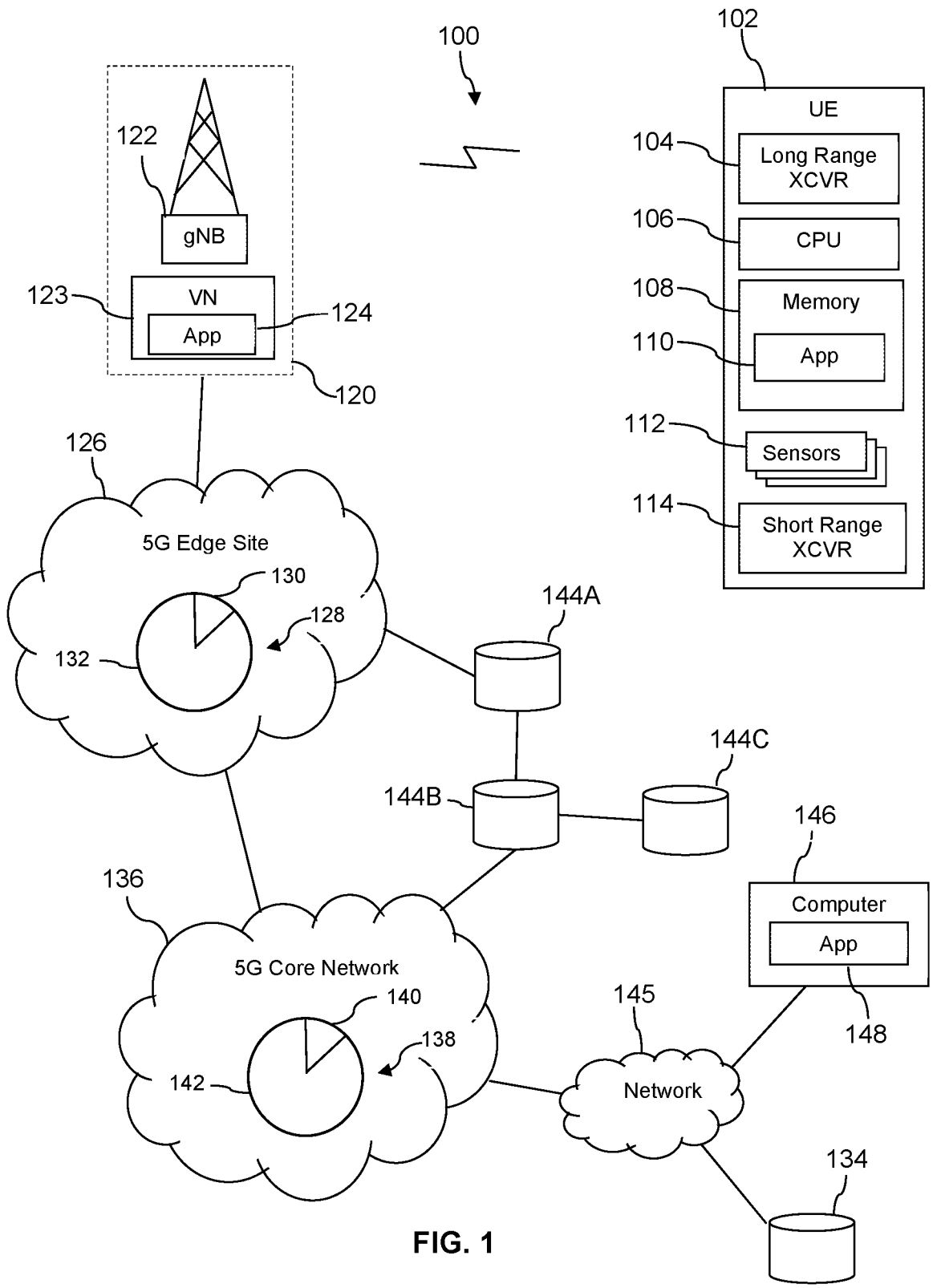
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below but may be modified within the scope of the appended claims along with their full scope of equivalents.

The majority of UEs, such as mobile phones, gaming devices, and virtual home assistants, can rely on nominal security provided by provider applications and virtual private networks (VPN) for the data and communication transmitted. However, business customers may request a higher level of security for data and communication traffic. For example, a healthcare organization may request that personal health information (PHI) and personal identity information (PII) to be obscured from view by hackers to prevent identity theft or identification of patients. Financial institutions may have encryption requirements for interactive sessions for financial transactions to prevent insider trading, the loss of trade secrets, or identity theft. Likewise, autonomous vehicle applications may request the data be shielded from hackers to prevent disrupting or inhibiting control of the vehicle. These types of business customers can request additional security of data encryption. One solution would place a third party application at each edge computing location. However, each edge computing location may become overloaded with an autonomous car application for each brand of vehicle, a financial institution application for each financial institution, and a medical application for every doctor's office, testing laboratory, and hospital executing at each edge location. Some of the encrypted data may need to be processed at the edge location, while the remainder can be routed to another location. The encrypted data and communication may introduce unwanted latency as the data is decrypted, analyzed, processed, and routed to another location. A solution for processing and routing encrypted data without adding undesirable latency is needed.

One solution can use homomorphic encryption (HE) to encrypt all or a portion of the data or communication. Homomorphic encryption (HE) is a form of encryption that can allow calculations on the data while the data remains encrypted. For example, if a computation is performed on the HE encrypted data, the result is the same as if the operation had been performed on the unencrypted data. In an embodiment, a traffic application executing on an edge location can reduce the latency of encrypted data by determining the type of data, processing the data, or routing the data to another node or network slice. The data can include one or more parts encrypted by HE data. For example, the header of the data stream can be encrypted with HE encryption, while the data set is encrypted with a second type of encryption or unencrypted. The nature of the HE data can be determined by decrypting a portion of the data, performing an operation on the HE data, or comparing the encrypted data to a known data type. The HE encryption prevents the data from being compromised by a hacker while allowing the data to be processed or routed to another application.

A network location can receive encrypted data from a secure application on a UE. An application executing at the network location can save the data to a file, process the data, and transfer the data to a remote application or storage location. However, this transfer of encrypted data becomes problematic with a data stream, for example, transmitting medical sensor data such as data produced by a heart monitor. The transfer of encrypted medical sensor data to a central location would be secure but would also introduce unwanted latency as the data must be transmitted from the monitoring device to a central server via an access node via a regional node via a network to the monitoring application executing on a server. Consider the example of an infant monitor placed in the nursery to monitor the respiration of an infant with a family history of sudden infant death syndrome (SIDS). The data from the medical monitoring device must be encrypted to maintain patient privacy, but more so to protect against hackers disrupting the transmission of data. The encrypted data from the baby monitor must rely on a low latency method of transfer. If the baby monitor detects an adverse respiratory rate in the middle of the night, the monitoring system can alert the parents with a phone call, turn on the lights through home automation, and sound an alarm in the nursery, but current methods of transferring encrypted data to a centralized location cause unwanted delay with high latency. A solution avoiding high latency, also called non-low latency, when transmitting medical data is needed. In an embodiment, the latency of the data can be reduced if the data traffic can be routed to a distributed storage location with multiple network connections. Sending encrypted data in segments of data sequenced together to maintain the integrity of the data set can provide the solution to transferring encrypted data from network nodes to the remote applications. A transfer application executing on a network node can process a time bound portion of the encrypted data to a data record that is saved to a multi-segment filename. The data records can be bound together in a sequence that preserves the integrity of the data. Alternatively, the data records can be saved to a private blockchain that preserves the integrity of the data. The data records from the encrypted data can be saved into a distributed file storage as the encrypted data stream is received. The remote application or storage location destination of the encrypted data can receive the encrypted data from the access node via the distributed storage locations. The encrypted data stream can be accessed by one or more remote applications with a reduced amount of latency.

Autonomous vehicles are essentially mobile data centers that process large amounts of data as they travel. The term autonomous vehicles (AV) can refer to a truly driverless vehicle, an application that maintains the vehicle on the roadway with no driver interaction, or a driver assist application that adds information, alerts, and some automated operations such as emergency braking. These AVs can communicate large amounts of data (e.g., vehicle status, road status, and location data) wirelessly to a central location. This data may be encrypted to prevent disruption of operations from hackers. The encryption of data can introduce unwanted latency as the encrypted data is transmitted to a central or regional application. Multiple AVs may be traveling along the same congested freeway in a major metropolitan area. One AV may experience hydroplaning due to heavy rainfall onto the roadway. The datacenter processing data within the AV may send an encrypted data alert to the other AVs in close proximity. The path the encrypted data takes from the AV to a central server for decryption and processing before sending out an encrypted alert may induce large amounts of delay (or latency). The delay in the alert messaging may cause a second or third AV to encounter the high water before the alert is received. In an embodiment, one solution to avoid the latency is to use HE encryption for the routing of non-low latency (e.g., high latency) data away from the access node to a regional node for processing. For example, a transfer application executing on an access node can determine the nature of the data by processing the HE encrypted data. The processing can include one or more operations performed on the data. The analysis of the HE encrypted data can determine if the data is non-low latency or low latency data. The transfer application can route non-low latency data (e.g., vehicle status, routine messages) to the regional node for processing. The transfer application can route low latency data to an application executing on a slice for processing. The transfer application can route AV communication to a second or third AV for communicating traffic conditions or road conditions. The routing of encrypted data by the transfer application after determining the nature of the data can reduce the latency by transferring non-low latency traffic away from the access nodes.

Large volumes of data traffic from UEs, business customers, medical devices, IoTs, and AVs are anticipated in the 5G network. Some of the data traffic is non-low latency data that needs to be stored or processed on a predetermined schedule. However, a portion of the data traffic is low latency data for immediate delivery or immediate processing. Much of this data traffic needs to be encrypted to protect customer information, customer identification (e.g., due to privacy regulations), or the data itself from unwanted disclosure or hackers. The encryption of both non-low latency data and low latency data may cause a slowing of data traffic as the access nodes are routing both types of traffic to the designated destinations on the 5G core network (e.g., an application on a network slice). Routing encrypted data traffic creates a problem of the slowing of the overall volume of data traffic as all the encrypted data is routed in the same manner. The slowing of data traffic can be especially problematic for low-latency data, such as interactive applications or medical events. One solution to the problem of routing encrypted data is to change the type of encryption. Encrypting portions of the data with different types of HE can allow a managing application at an access node to determine the type of data and whether to route the traffic or hand-off the routing to another managing application. The HE encryption allows the processing of data while encrypted so that the managing application can determine the nature of the data without decrypting the data. This solution can move non-low latency data traffic handling to another network slice within the 5G network for processing and thereby reduce the latency of data traffic.

Turning now to FIG. 1, a mobile communication system 100 is described. In an embodiment, the mobile communication system 100 comprises a first communication device (user equipment-UE 102), a micro-data center (MDC) node 120, a 5G edge site 126, a 5G core network 136, a network 145, a distributed data storage system 144, a remote storage location 134, and a remote computer 146. The UE 102 is communicatively connected to a mobile carrier that comprises a long-range radio transceiver 104, a processor 106, non-transitory memory 108 with one or more user applications 110, a plurality of sensors 112, and a short range radio transceiver 114. A UE 102 may be a computing device such as a cell phone, a smartphone, a wearable computer, a smartwatch, a headset computer, a laptop computer, a tablet computer, or a notebook computer. A UE 102 may be a computer system with a processor, memory, data storage, and input devices, as will be described further hereinafter. A UE 102 may be a virtual home assistant that provides an interactive service such as a smart speaker, a personal digital assistant, a home video conferencing device, or a home monitoring device. A UE 102 may be a gaming device such as a virtual reality headset, immersive reality headset, or a gaming platform. A UE 102 may be an IoT device such as an appliance, a home monitoring device, a home security device, or a home access device. A UE 102 may be a medical device such as a medical monitoring device, a wearable device, a video access device, or a home testing device. A UE 102 may be an interactive robot device such as a remote surgical robot. A UE 102 may be an autonomous vehicle such as a self-driving vehicle without a driver, a driver assisted, an application that maintains the vehicle on the roadway with no driver interaction, or a driver assist application that adds information, alerts, and some automated operations such as emergency braking. The network 145 may be one or more private networks, one or more public networks (e.g., the Internet), or a combination thereof.

The MDC node 120 can include an access node 122, a virtual network (VN) 123, and one or more node applications 124. The access node 122 may also be referred to as a cellular site, cell tower, cell site, or, with 5G technology, a gigabit Node B. The access node 122 provides wireless communication links to the UE 102 according to a 5G, a long term evolution (LTE), a code division multiple access (CDMA), or a global system for mobile communications (GSM) wireless telecommunication protocol. The VN 123 can be proximate the access node 122. The VN 123 may include the standard servers, off-the-self switches, and storage devices to support a virtual network. In an embodiment, the one or more node applications 124 can execute on a virtual network function (VNF). The VNF and node application are described in more detail, further hereinafter. In an embodiment, the one or more node applications (e.g.,124) can execute on a network slice within the virtual network. Alternatively, the VN 123 may be a server executing a standard server operating environment. Alternatively, the VN 123 may be a computer system, as will be described further hereinafter.

The UE 102 may establish a wireless link with the mobile carrier network (e.g., 5G core network 136) with a long-range radio transceiver 104 to receive data, communications, and, in some cases, voice and/or video communications. The UE 102 may also include a display, an input device (e.g., touchscreen display, keyboard, etc.), a camera (e.g., video, photograph, etc.), a speaker for audio, or a microphone for audio input by a user. The short range radio transceiver 114 may establish wireless communication with Bluetooth, WiFi, or other low power wireless signals such as ZigBee, Z-Wave, 6LoWPan, Thread, and WiFi-ah. The long-range radio transceiver 104 may be able to establish wireless communication with the access node 122 based on a 5G, LTE, CDMA, or GSM telecommunications protocol. The UE 102 may be able to support two or more different wireless telecommunication protocols and, accordingly, may be referred to in some contexts as a multi-protocol device. The UE 102 may communicate with another UE via the wireless link provided by the access node 122 and via wired links provided by 5G edge site 126, 5G core network 136, and the network slice 140. Although UE 102 is illustrated as a single device, UE 102 may be a system of devices. For example, sensors 112 may include sensors that are communicatively coupled to UE 102, such as a heart rate monitor that is communicatively connected to the short range radio transceiver 114. Another example may be an immersive gaming device with a sensor 112 that is a hand held input (e.g., a lightsaber) communicatively connected to the short range radio transceiver 114 of the UE 102. Still another example may be a sensor 112 that is a video input on an AV that is communicatively coupled (e.g., wired or wirelessly) to UE 102. The system of devices may include any combination of one or more sensors as a separate device, the long range transceiver 104 as a separate device, the short range transceiver 114 as a separate device that is communicatively coupled to the UE 102.

The 5G edge site 126 can be communicatively coupled to the MDC node 120. The 5G edge site 126 may also be referred to as a regional data center (RDC) and can include a virtual network in the form of a cloud computing platform. The cloud computing platform can create a virtual network environment from standard hardware such as servers, switches, and storage. The total volume of computing availability 128 of the 5G edge site 126 is illustrated by a pie chart with a portion illustrated as a network slice 130 and the remaining computing availability 132. The network slice 130 represents the computing volume available for storage or transfer of data. The cloud computing environment is described in more detail, further hereinafter. Although the 5G edge site 126 is shown communicatively coupled to the MDC node 120, it is understood that the 5G edge site 126 may be communicatively coupled to a plurality of access nodes (e.g., 122) in addition to one or more MDC nodes (e.g., 120). The 5G edge site 126 may receive all or a portion of the voice and data communications one or more MDC nodes 120 and one or more access nodes (e.g., 122). The 5G edge site 126 may process all or a portion of the voice and data communications or may pass all or a portion to the 5G core network 136 as will be described further hereinafter. Although the virtual network is described as created from a cloud computing network, it is understood that the virtual network can be formed from a network function virtualization (NFV). The NFV can create a virtual network environment from standard hardware such as servers, switches, and storage. The NFV is more fully described by European Telecommunications Standards Institute (ETSI) Group Section (GS) NFV 002 v1.2.1 (2014-12) described in more detail, further hereinafter.

The 5G core network 136 can be communicatively coupled to the 5G edge site 126 and provide a mobile communication network via the 5G edge site 126 and MDC node 120. The 5G core network 136 can include a virtual network in the form of a cloud computing platform. The cloud computing platform can create a virtual network environment from standard hardware such as servers, switches, and storage. The total volume of computing availability 138 of the 5G core network 136 is illustrated by a pie chart with a portion illustrated as a network slice 140 and the remaining computing availability 142. The network slice 140 represents the computing volume available for storage or processing of data. The cloud computing environment is described in more detail further hereinafter. Although the 5G core network 136 is shown communicatively coupled to the 5G edge site 126, it is understood that the 5G core network 136 may be communicatively coupled to a plurality of access nodes (e.g., 122) in addition to one or more MDC nodes (e.g., 120). The 5G core network 136 may receive all or a portion of the voice and data communications via 5G edge site 126, MDC node 120, and access nodes (e.g., 122). The 5G core network 136 may process all or a portion of the voice and data communications as will be described further hereinafter. Although the virtual network is described as created from a cloud computing network, it is understood that the virtual network can be formed from a network function virtualization (NFV). The NFV can create a virtual network environment from standard hardware such as servers, switches, and storage. The NFV is described in more detail, further hereinafter.

A remote storage location 134 can be communicatively coupled to the 5G network via the network 145. The remote storage location 134 can be a computer, a server, or any other type of storage device.

A remote application 148 executing on a remote computer 146 can be communicatively coupled to the 5G core network 136 via the network 145. The remote computer 146 can be a computer system, a server, or a plurality of computer devices. Although one remote application 148 is shown, it is understood that there may be 2, 3, 4, 5, 10, 20, or any number of applications executing on a plurality of computer systems (e.g., 146).

The distributed data storage system 144 can comprise two or more interconnected data storage sites. The storage sites (e.g., 144A, 144B, and 144C) may be referred to as nodes and may replicate the information in all or a portion of the nodes. Although the distributed data storage system 144 is illustrated with three storage sites (e.g., 144A-C), any number of storage sites may be used.

Figure 2A:
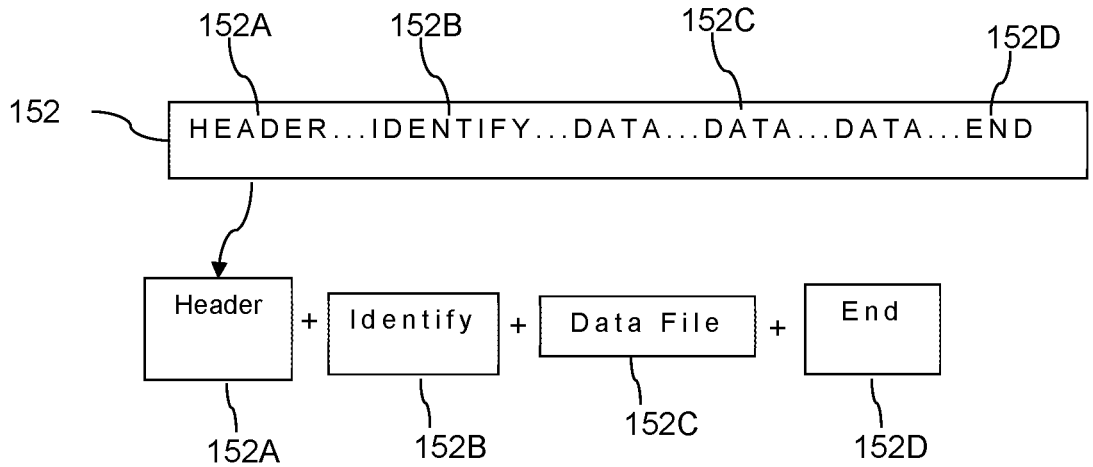
FIG. 2A is an illustration of an encrypted data set according to an embodiment of the disclosure.

In an embodiment, the UE 102 may transmit encrypted data collected from sensors 112 to the MDC node 120. The data collected from the sensors 112 may include sensitive data such as the user identity and financial information or medical information. A user application 110 executing on UE 102 may encrypt the data collected into an encrypted data set 152. Turning now to FIG. 2A, an encrypted data set 152 may include a header 152A, a user identification 1526, a set of data or data file 152C, and an end file 152D. The data set may be encrypted with fully homomorphic encryption (HE) or non-fully HE. The non-fully HE may include encryption types of partially HE, somewhat HE, and leveled fully HE. The user application 110 may encrypt all parts (e.g., 152A, 152B, 152C, and 152D) of the data set with one type of HE, for example fully HE. The user application 110 may encrypt each part of the encrypted data set 152 with a different encryption method, a non-homomorphic encryption, or no encryption. For example, the user application 110 may encrypt the header 152A with partially HE, the user identification 152B with somewhat HE, the data file 152C with leveled fully HE, and the end file 152D with fully HE. The user application 110 may encrypt one part of the encrypted data set 152 with a non-homomorphic encryption such as a symmetric key method or public key method.

Each part (e.g., 152A, 152B, 152C, and 152D) of the data set may be encrypted with the same encryption key. Alternatively, each part of the data set may be encrypted with different encryption keys. For example, the header 152A may be encrypted with a first encryption key, the user identification 1528 may be encrypted with a second encryption key, the data file 152C may be encrypted with a third encryption key, and the end file 152D may be encrypted with a fourth encryption key. The HE encryption may use a public encryption key, a private encryption key, or any combination thereof. Thus, in an embodiment, the first encryption key may be used by a first entity to decrypt the header 152A and take action accordingly while not revealing the remainder of the data set 152 which remains confidential to that network element, network node, or network function. In an embodiment, a second entity may use the second encryption key to decrypt the user identification 1528 and take action accordingly while not revealing the data file 152C. In an embodiment, a third entity may use the third encryption key to decrypt the data file 152C and take action accordingly while not revealing the end file 152D. In an embodiment, a fourth entity may use the fourth encryption key to decrypt the end file 152D and take action accordingly. In an embodiment, the first entity may hold only the first encryption key; the second entity may hold the first encryption key and the second encryption key but not hold the third encryption key or the fourth encryption key; in an embodiment, the third entity may hold the first encryption key, the second encryption key, and the third encryption key but not hold the fourth encryption key; in an embodiment, the fourth entity may hold the first encryption key, the second encryption key, the third encryption key, and the fourth encryption key. The encrypted data set 152 may include time sensitive data collected from a financial application such as a trade on a securities market. The encrypted data set 152 may include time sensitive data collected from a medical device such as a fall monitoring device.

Figure 2B:
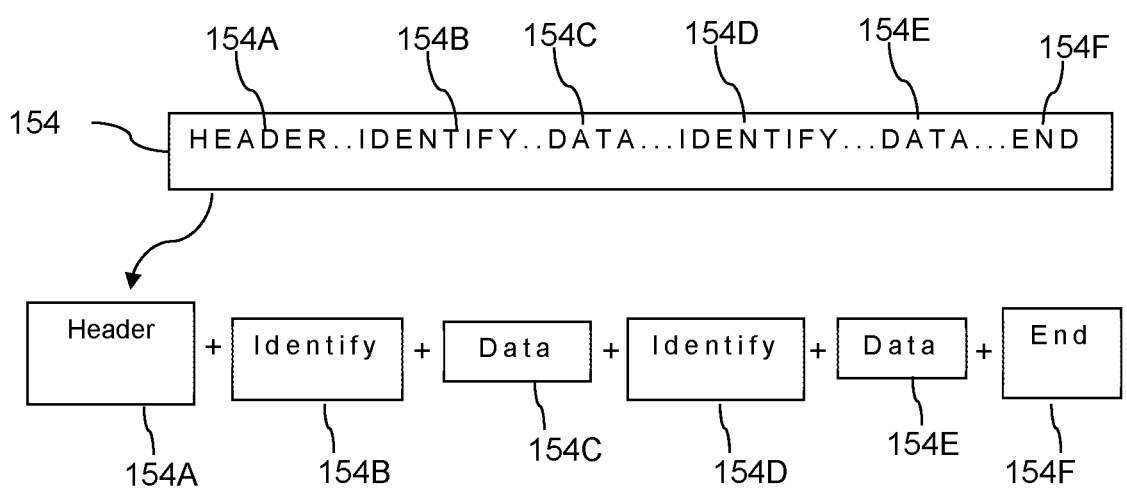
FIG. 2B is an illustration of an encrypted data stream according to an embodiment of the disclosure.

Turning now to FIG. 2B, the data transmitted by the UE 102 may be an encrypted data stream 154. The data collected from the sensors 112 may include sensitive data such as the user identity and vehicle information or medical information. An encrypted data stream 154 may include a header 154A, a user identification 154B, a set of data or data set 154C, a second user identification 154D, a set of data 154 E, and an end file 154F. Each part of the data may link to the next part of the encrypted data stream 154. For example, the header 154A may link to the user identification 154B that may link to the first data set 154C that may link to the second user identification 154D that may link to the second data set 154E that may link to the end file 154F. The linkage between sections of the encrypted data stream 154 may prevent a loss of data by identifying each part of a streaming data set. Although two data sets (e.g., 154C and 154E) are shown, there may be 3, 4, 5, 10, 20, 40, or any number of data sets in the encrypted data stream 154. The data sets (e.g., 154C) may be time bound where the data set is gathered during a time period. The term time bound may refer to a data set that is gathered during a time period measured from a first timestamp to a second timestamp. For example, the second data set 154E may include data with timestamp 12 seconds to 14 seconds of the data stream. The data sets (e.g., 154C and 154E) may be set bound where the data set is determined by the number of data points. The term set bound may be defined as a data set that is gathered sequentially over a predetermined number of data points from a starting data point to an ending data point. For example, the first data set 154C may be set bound with 120 data points that include data point 1 through data point 120. The data stream may be encrypted with fully HE or non-fully HE. The non-fully HE may include encryption types of partially HE, somewhat HE, and leveled fully HE. The user application 110 may encrypt all of the parts of the data stream (e.g., 154) with one type of HE, for example fully HE. The user application 110 may encrypt each part of the encrypted data stream 154 with a different encryption method, a non-homomorphic encryption, or no encryption. For example, the user application 110 may encrypt the header 154A with partially HE, the second user identification 154D with somewhat HE, the first data set 154C with leveled fully HE, and the end file 154F with fully HE. The user application 110 may encrypt one part of the encrypted data stream 154 with a non-homomorphic encryption such as a symmetric key method or public key method. Each part (e.g., 154A, 154B, 154C, 152D, 154E, and 154F) of the data set may be encrypted with the same encryption key. Alternatively, each part of the data set may be encrypted with different encryption keys. For example, the header 154A may be encrypted with a first encryption key, the user identification 154B may be encrypted with a second encryption key, the data file 154C may be encrypted with a third encryption key, and the end file 154F may be encrypted with a fourth encryption key. The HE encryption may use a public encryption key, a private encryption key, or a combination of the two. The encrypted data stream 154 may include time sensitive data collected from a medical device such as respiration rate from an infant. The encrypted data stream 154 may include time sensitive data collected from an AV such as operational conditions alerting other AVs to an accident.

Turning back to FIG. 1, the UE 102 may transmit an encrypted data set 152 to a managing application 124 (e.g., node application 124) executing on a VN 123 on the MDC node 120. The managing application 124 may be one or more of the node applications 124 executing on a VN 123. The managing application 124 can examine the encrypted data set to determine if the data set is encrypted, if the data set has some non-encrypted parts or data sets, or if the data set has different encryptions methods applied to parts of the data set. The managing application can determine a data characteristic of the encrypted data set 152 by performing one or more mathematical operations or Boolean operations on the encrypted data set 152. For example, the managing application 124 can perform one or more multiplication operations on the encrypted data set 152 to determine if the data encryption is partially HE, somewhat HE, leveled fully HE, or fully HE. The differences in HE encryption can be determined by performing more than one operation. For example, fully HE can provide results for multiple mathematical operations whereas partially HE can only provide results for one type of operation. The managing application 124 may analyze a part of the encrypted data set 152 (e.g., the header 152A) if the encrypted data set 152 has parts (e.g., 152A) encrypted with an HE type encryption. The data characteristic of the encrypted data can include the type of data and the latency of data. For example, the encrypted data may be an equipment status for storage. The equipment status data may be non-low latency data (e.g., high latency data) that will be processed on a periodic schedule to determine the lifecycle of the equipment. Another example may be a health alert, such as an infant that has stopped breathing. The health alert may be low latency data for immediate processing that includes an alert message and respiration data. The managing application 124 can determine where to transmit the encrypted data set 152 based on the type of data that has been encrypted. For example, if the encrypted data set 152 is determined to be non-low latency data type that will be for storage or non-time sensitive processing, the managing application 124 may transfer the encrypted data set 152 to network slice 140 on the 5G core network 136. The transfer of non-low latency data away from the MDC node 120 and 5G edge site 126 may lower the data traffic volume in the MDC node 120 and lower the latency and improve QoS. If the encrypted data set 152 is determined to be time sensitive but non-low latency data, the managing application 124 may transfer the encrypted data set 152 to network slice 130 on the 5G edge site 126 for processing. The transfer of non-low latency data away from the MDC node 120 may lower the volume of data traffic and lower the latency. If the managing application 124 determines the encrypted data set 152 is low latency data (e.g., interactive), the managing application 124 can process the encrypted data set 152 and transmit the process data back to the UE 102, to another UE, or transmit the processed data set to another application (e.g., remote application 148).

In an embodiment, the UE 102 may transmit an encrypted data stream 154 to the managing application 124 executing on a VN 123 of the MDC node 120. The managing application 124 can process the encrypted data stream 154 in the same manner as previously described. The managing application 124 can analyze part of the encrypted data stream 154, for example data set 154C, to determine the type of encryption used and the type of data within the data stream. The managing application 124 can transfer non-low latency data to network slice 140 on the 5G core network 136. The transfer of non-low latency data away from the MDC node 120 and 5G edge site 126 may lower the volume of data traffic in the MDC node 120 and lower the latency and improve QoS. If the encrypted data stream 154 is determined to be time sensitive but non-low latency data, the managing application 124 may transfer the encrypted data stream 154 to network slice 130 on the 5G edge site 126 for processing. If the managing application 124 determines the encrypted data stream 154 is low latency data (e.g., interactive), the managing application 124 can process the encrypted data stream 154 and transmit the process data back to the UE 102, to another UE, or transmit the processed data set to another application (e.g., remote application 148).

Figure 3:
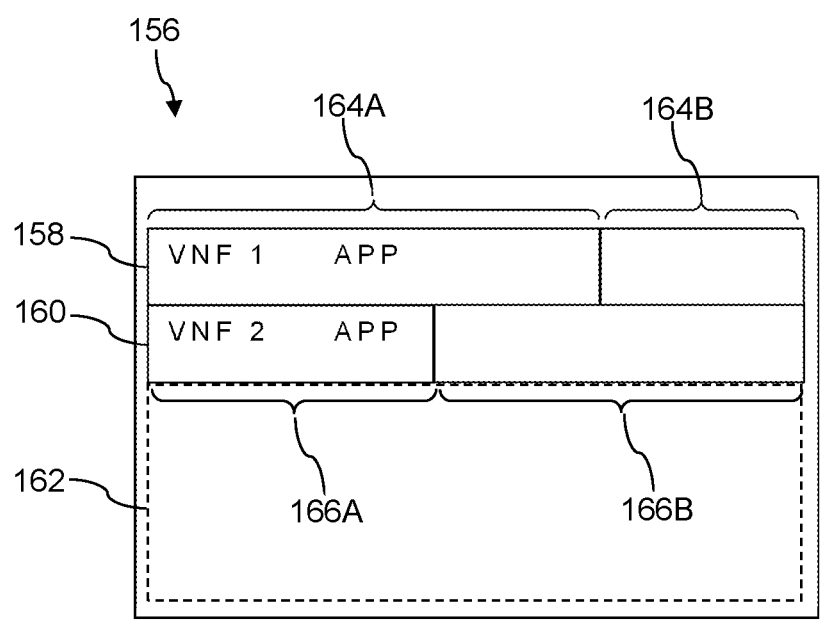
FIG. 3 is a block diagram of an application within a virtual network function on a network slice according to an embodiment of the disclosure.

The encrypted data stream 154 or the encrypted data set 152 may need to be processed by a remote application executing on a network slice (e.g., 140). Turning now to FIG. 3, a representative example of a network slice 156 is described. A computing service executing on network slice 156 can comprise a first virtual network function (VNF) 158, a second VNF 160, and an unallocated portion 162. The computing service can comprise a first application 164A executing on a first VNF 158 and a second application 166A executing on a second VNF 160. The first application 164A and second application 166A can be computing service applications generally referred to as remote applications. The total computing volume can comprise a first VNF 158, a second VNF 160, and an unallocated portion 162. The unallocated portion 162 can represent computing volume reserved for future use. The first VNF 158 can include a first application 164A and additionally allocated computing volume 164B. The second VNF 160 can include a second application 166A and additionally allocated computing volume 166B. Although two VNFs are illustrated, the network slice 156 can have a single VNF, two VNFs, or any number of VNFs. Although the first VNF 158 and second VNF 160 are illustrated with equal computing volumes, it is understood that the computing volumes can be non-equal and can vary depending on the computing volume needs of each application. The first application 164A executing in VNF 158 can be configured to communicate with or share data with the second application 166A executing in the second VNF 160. The first application 164A and second application 166A can be independent and not share data or communicate with each other. Although the network slice 156 is illustrated with two VNFs and an unallocated portion 162, the network slice 156 may be configured without an unallocated portion 162. Although only one application, a first application 164A, is described executing within the first VNF 158, two or more applications can be executing within the first VNF 158 and second VNF 160. In an embodiment, the network slice 156 may be the network slice 130 on the 5G edge site 126. In an embodiment, the network slice 156 may be the network slice 140 on the 5G core network 136. In an embodiment, the network slice 156 may be the VN 123 on the MDC node 120. The managing application 124 may be first application 164A executing on VNF 158.

Figure 4:
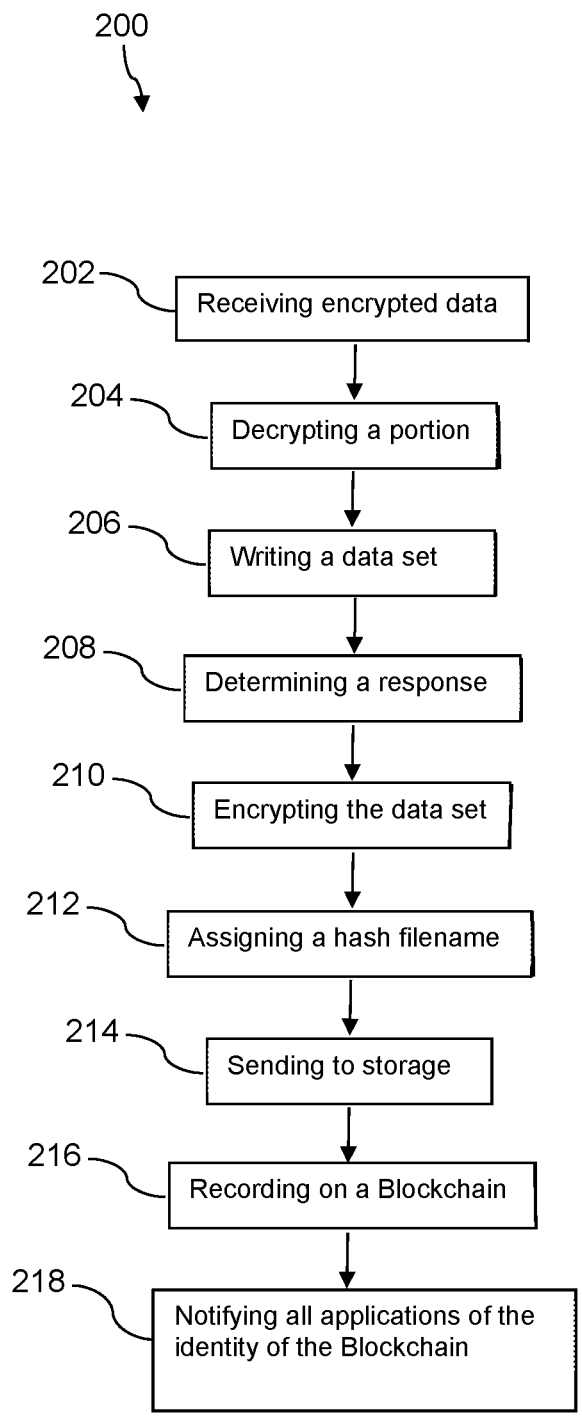
FIG. 4 is a logical flow diagram of a method for the secure transfer of an encrypted data stream according to an embodiment of the disclosure.

The encrypted data stream 154 can be sent to one location (e.g., network slice 140) with low latency, however latency increases if a second or third processing applications are located away from the first location. An encrypted data stream 154 can be processed by multiple applications simultaneously or near simultaneously when saved to a distributed data storage system. Turning now to FIG. 4, a method 200 for the secure transfer of an encrypted data stream is illustrated. At block 202, an encrypted data stream 154 from a UE 102 is received by a transfer application 124 executing on a VN 123 coupled to an access node 122. The transfer application may be one or more of the node applications 124 shown on FIG. 1. The transfer application 124 (e.g., node application 124) may be executing on a VN 123 on the MDC node 120. Alternatively, the transfer application 124 may be executing on a network slice 130 on the 5G edge site 126 communicatively coupled to the access node 122. At block 204, the transfer application 124 decrypts the encrypted data stream 154 with a public encryption key. The public encryption key is distributed to the transfer application 124 by a key management server. The transfer application 124 may decrypt all portions of the encrypted data stream 154. For example, the first portion of the encrypted data stream 154 can be a part (e.g., the header 154A), followed by a time bound portion, or a set bound portion. The time bound portion may be a portion that is gathered during a time period beginning after the previous portion ended. The set bound portion may be a portion that is gathered by a predetermined number of data points beginning when the previous portion ended. The transfer application 124 may decrypt the portions of the encrypted data stream 154 sequentially. In an embodiment, the transfer application 124 may decrypt one or more portions of the encrypted data stream 154 leaving the remaining portions encrypted. For example, the transfer application 124 may only decrypt the header 154A and not the remaining portions of the encrypted data stream 154.

At block 206, the transfer application 124 may write each portion of the encrypted data stream 154 to one or more application data sets. For example, the transfer application 124 may write the header 154A to an application data set, the user identification 154B to another application data set, and one or more portions of the data set 154C to one or more application data sets. The transfer application 124 may write a decrypted portion or an encrypted portion of the encrypted data stream 154 to one or more data sets. The application data set may be in the form of a database, a data file, or a data set. The transfer application 124 may also include an identity file in the form of a document, a text document, or a data file. The identity file may include personally identifiable information (PII) and/or protected health information (PHI). In an embodiment, the identity file is not decrypted but remains encrypted when written to the application data set.

At block 208, the transfer application 124 may analyze the application data set and determine a network response. The analysis of the application data set may include identification of the data type, processing of the data set, or determining an encrypted data destination. The encrypted data destination can include any combination of one or more remote applications (e.g., 164A) on one or more network slices (e.g., 140), a remote application 148 on a remote computer 146, a remote storage location 134, or a distributed storage node 144A.

At block 210, the transfer application 124 can encrypt the application data set with an encryption method and private encryption key. The encryption method may be an asymmetric encryption method such as GNU privacy guard (GPG). Although a private key is described, it is understood that the encryption key may be a private key, a public key, or any combination of the two. At block 212, the transfer application 124 may create a hash filename for the encrypted application data set by hashing the encrypted application data set with a hash function such as message-digest algorithm (MD5), secure hashing algorithm (SHA)-1, SHA-2, SHA-3, or BLAKE3. The hash filename becomes the filename of the encrypted application data set.

At block 214, the transfer application 124 can transmit the encrypted application data set and hash filename to a distributed data storage system 144. The transfer application 124 may communicatively couple to the closest distributed storage node 144A to transfer the files. If the transfer application 124 detects a delay (e.g., latency) in the communication, the transfer application 124 may communicatively couple to another distributed storage node for example 144B. The distributed data storage system 144 may store the encrypted application data set with the hash filename. In an embodiment, the transfer application 124 may transmit the encrypted application data set and hash filename to a storage computer, a storage server, a storage location within a slice, a remote server, or a server with distributed content located on one or more slices.

At block 216, the transfer application 124 may write a current data record into a blockchain to retain the integrity of the data. The transfer application 124 may assign a data record chain identity (e.g., blockchain identification) if the application data set is written to the data entry of the data record chain (e.g., blockchain) as will be described in more detail hereinafter.

At block 218, the transfer application 124 may notify the encrypted data destination (e.g., remote application 164A on VNF 158 of network slice 156) of the data record chain identity. In an embodiment, the transfer application 124 may transmit the data record chain identity (e.g., the blockchain identification) to one or more applications (e.g., remote application 148) executing on one or more computers (e.g., remote computer 146). In an example, a remote application executing on the network slice 140 of the 5G core network 136, a remote application executing on the network slice 130 of the 5G edge site 126, and the remote application 148 on the remote computer 146, can simultaneously or near simultaneously retrieve the data records (e.g., 222), created from the encrypted data stream 154, from the blockchain 220 saved to the distributed data storage system 144.

Figure 5:
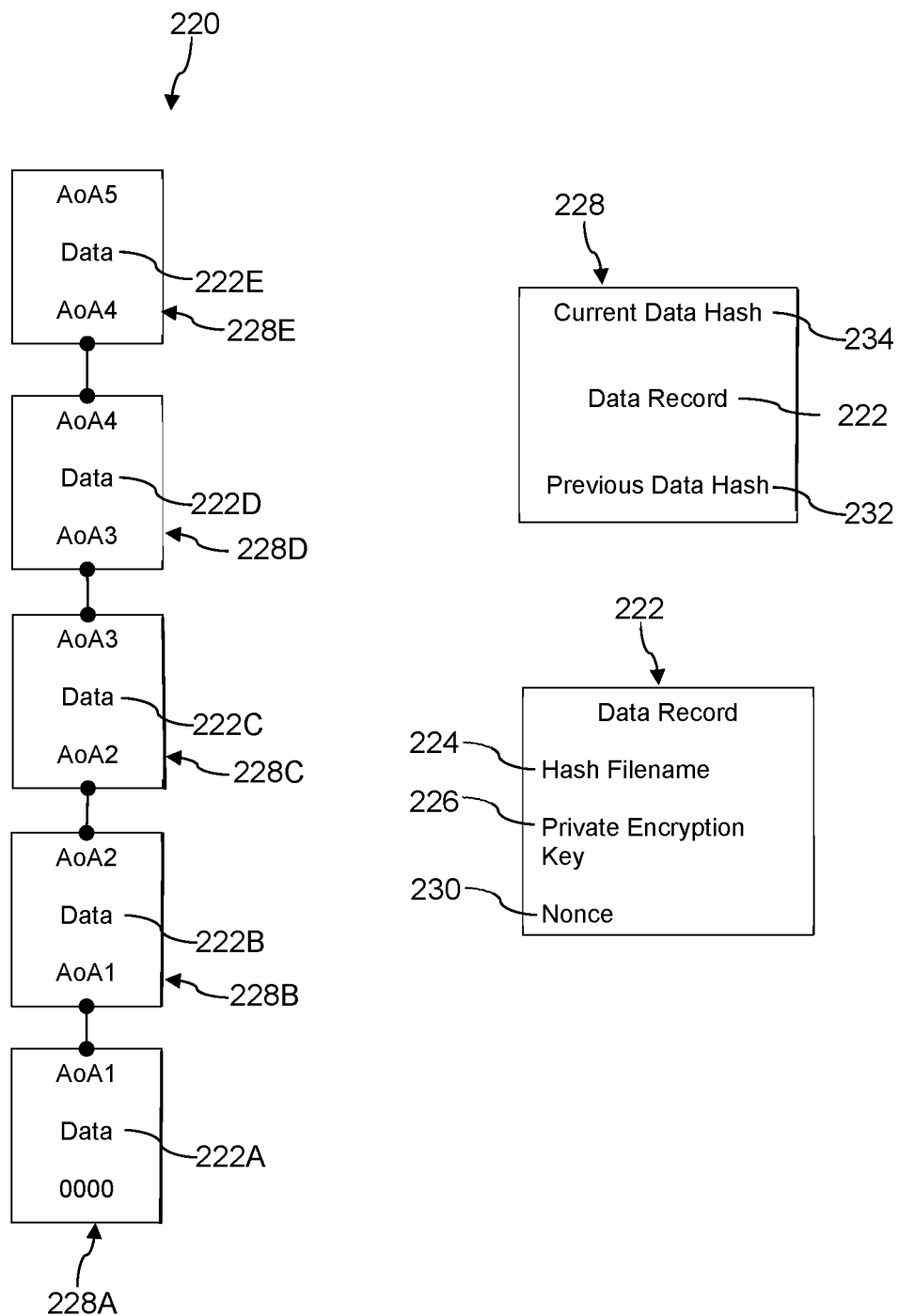
FIG. 5 is a block diagram of a blockchain according to an embodiment of the disclosure.

Turning now to FIG. 5, the operation with a blockchain 220 is described. The blockchain 220 consists of multiple data entries 228 saved with a sequential method referred to as a chain. Each data entry 228 can include a data record 222, a previous data record hash 232, and the current data record hash 234. The data record can include the hash filename 224, the private encryption key 226, and a nonce 230. A nonce 230 is a number or alphanumeric character string added to the data record 222 to achieve a desired effect on the current data record hash 234. The method to create the blockchain 220 includes the following steps. The transfer application 124 can save the hash filename 224, the private encryption key 226 and a nonce 230 onto the data record 222. The transfer application 124 then produces a hash of the data record 222 with a hash function. A hash function is a type of encryption method that produces a fixed-length character string (e.g., 64 characters of text) from any size of an input file or text string. In an example shown, a current data record hash 234 is illustrated with four characters:

"AoA1" where the "Ao" identifies the type of hash function used, and the remaining two characters illustrate the fixed-length character field. The hash (current data record hash 234) of the data record 222 does not replace the contents of the file but represents the file with a unique character string identifier. The nonce 230 may be selected by the hash function to achieve an effect on the current data record hash 234 such as ending the hash with two zeros (e.g., 00). For example, a nonce of "23789" may change the current hash from "AoA1" to "AoA100". The unique character string created by the hash function cannot be decrypted. Said another way, the original file cannot be reconstructed from the unique character string. As previously described, hash functions are well-known encryption methods (e.g., SHA256, MD5, Bcrypt, and RIPEMD-160).

The sequence of data entry 228 can be linked with the current data record hash 234 and previous data record hash 232. As shown in the example blockchain 220, by placing a previous data record hash 232, "AoA1" in the data entry 228B, the remote application 148 identifies that data entry 228B is a sequential record with data entry 228A. The data record 222 cannot be altered after being written into the data entry 228 because a hash of the data record 222 has been saved in the data entry 228 as current data record hash 234. A change to the data of the data record 222 would change the current data record hash 234, and the next entry of application data would no longer be sequential. A change in the data record 222 would cause the blockchain to break. In the example shown, data entry 228A can be the first or genesis data record with a previous data record hash 232 of "0000". The genesis data entry 228A can indicate a new encrypted data stream 154 from the UE 102. The current data record hash 234 "AoA1" can be the hash of the data record 222A. The second data entry 228B can contain the data record 222B with the current data hash "AoA2" of data record 222B and previous data hash 232 ("AoA1") identifying data entry 228B as being sequential in order to data entry 228A. The third data entry 228C can contain the data record 222C with the current data hash "AoA3" of data record 222C and previous data hash 232 ("AoA2") identifying data entry 228C as being sequential in order to data entry 228B. The fourth data entry 228D can contain the data record 222D with the current data hash "AoA4" of data record 222D and previous data hash 232 ("AoA3") identifying data entry 228D as being sequential in order to data entry 228C. The fifth data entry 228E can contain the data record 222E with the current data hash "AoA5" of data record 222E and previous data hash 232 ("AoA4") identifying data entry 228E as being sequential in order to data entry 228D. The sequence of data entry 228A-E are linked sequentially with the current data record hash 234 and the previous data record hash 232. Although the blockchain 220 in FIG. 5 shows five data entry 228A-E, the blockchain 220 can have 5, 50, 500, 5000, 50,000, or any number of data entry 228. In an embodiment, the transfer application 124 may assign a data record chain identity (e.g., blockchain identification) when the data record (e.g., 222) is written to the data entry (e.g., 228A) of the data record chain (e.g., blockchain 220).

Figure 6:
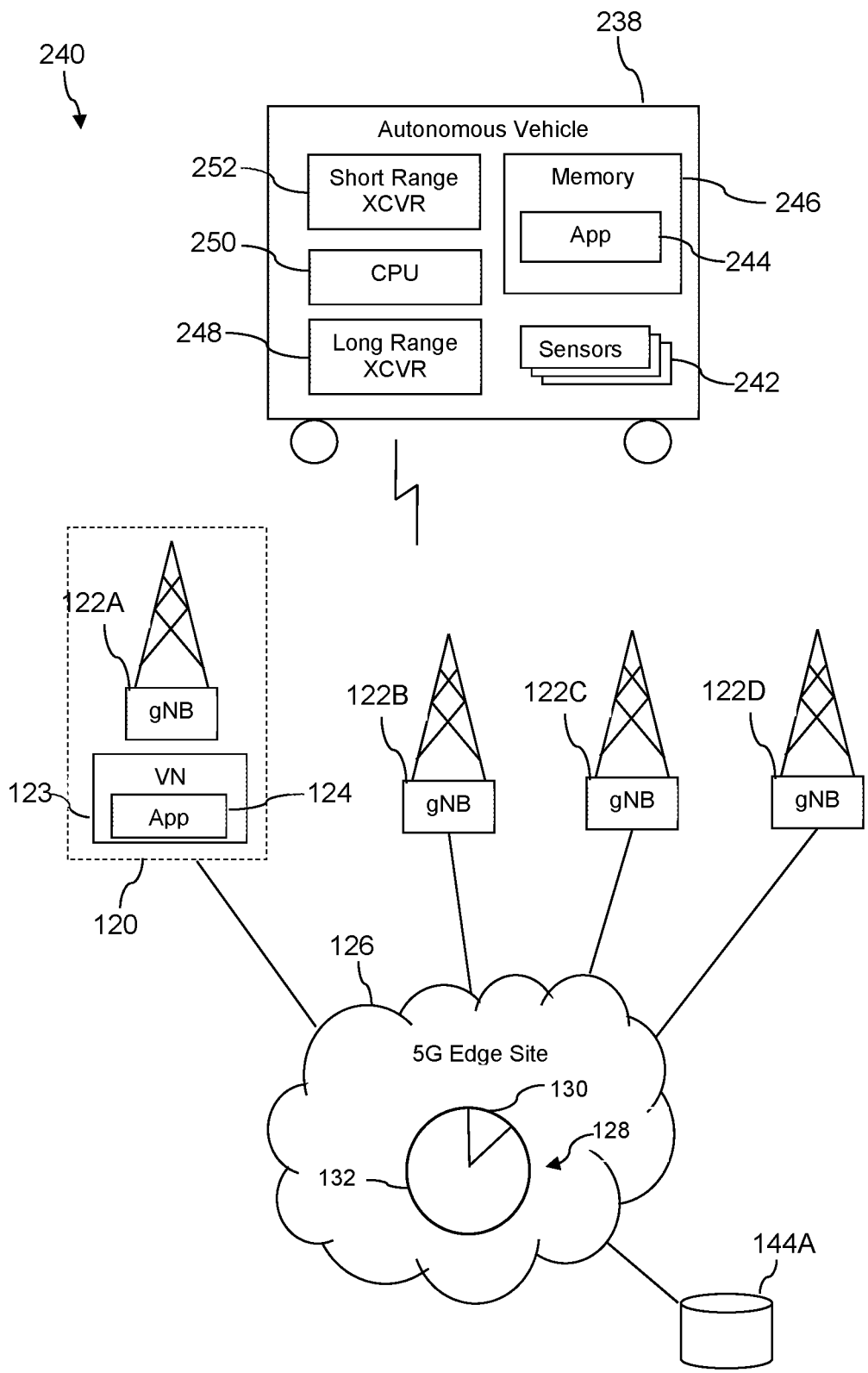
FIG. 6 is a block diagram of a communication system according to an embodiment of the disclosure.

An AV may need to send low latency data communications to one or more AVs while traveling at high speeds. A method of transferring encrypted data within a communication network is needed. Turning now to FIG. 6, a communication system 240 is described. In an embodiment, the communication system 240 comprises a first AV 238, an MDC node 120, a plurality of access nodes 122A-D, a 5G edge site 126, and a distributed data storage system 144. The AV 238 is communicatively coupled to the 5G network (e.g., 126, 136) and comprises a long range radio transceiver 248, a processor 250, non-transitory memory 246 with one or more applications 244, a plurality of sensors 242, and a short range radio transceiver 252 in communication with an MDC node 120. An AV 238 may be a vehicle such as a self-driving vehicle without a driver, a driver assisted vehicle with an application that maintains the vehicle on the roadway with no driver interaction, or a driver assist application that adds information, alerts, and some automated operations such as emergency braking. The MDC node 120 provides a wireless communication link to the AV 238 according to a 5G technology. The MDC node 120 may also communicate with LTE, CDMA, or GSM wireless communication protocol when the AV 238 is out of range of the 5G technology.

The AV 238 may establish a wireless link with the mobile carrier network (e.g., 5G edge site 126) with a long range radio transceiver 248 to receive data, communications, and, in some cases, voice and/or video communications. The AV 238 may also include a display, an input device (e.g., touchscreen display, keyboard, etc.), a camera (e.g., video, photograph, etc.), a speaker for audio, or a microphone for audio input by a user. The short range radio transceiver 252 may establish wireless communication with Bluetooth, WiFi, or other low power wireless signals such as: ZigBee, Z-Wave, 6LoWPan, Thread, and WiFi-ah. The AV 238 may communicate with another AV via the wireless link provided by the access node 122A-D via the 5G edge site 126. Although AV 238 is illustrated as a single device, AV 238 may be a system of devices. For example, the sensors 242 may include sensors that are communicatively coupled to AV 238 such one or more a video inputs that are coupled (e.g., wired or wirelessly) to AV 238. A sensor 242 may be a pressure sensor wirelessly coupled to the AV 238. The system of devices may include any combination of one or more sensors as a separate device, the long range transceiver 248 as a separate device, and the short range transceiver 252 as a separate device that are communicatively coupled to the AV 238.

As previously described, the MDC node 120 can include an access node 122A and one or more node applications 124 on a VN 123. The node applications 124 may be configured on a virtual network slice as described in FIG. 3.

The access nodes 122A-D may be configured regionally about a 5G edge site 126. The access nodes 122A-D may be located along a highway, within a busy traffic area, arrayed about a medical center, or extending into a neighborhood. The access nodes 122A-D can be communicatively coupled to 5G edge site 126, 5G core network 136 as shown in FIG. 1, or any combination thereof.

As previously described, a distributed data storage system 144 may be communicatively coupled to the 5G edge site 126, 5G core network 136 as shown in FIG.1, or any combination thereof. Although one storage node 144A is shown, it is understood that there may be any number of storage nodes from the distributed storage system 144 connected to the 5G edge site 126 and the 5G core network 136.

A transfer application 124 executing on an MDC node 120 may transfer the routing of data to a second transfer application (e.g., 166A on network slice 156) to lower the latency of data traffic on the MDC node 120. The transfer application 124 may examine an encrypted data stream 154, determine the nature of the data, and transfer the data routing to a second transfer application (e.g., 166A) on a 5G edge site 126 or to a third transfer application (e.g., 164A) on a 5G core network 136.

The AV 238 may transmit encrypted data collected from sensors 242 to the MDC node 120. The data collected from the sensors 242 may include operational data, environmental data, equipment status, and user identification. A data application 244 executing in non-transitory memory 246 may encrypt the data collected into an encrypted data set (e.g., 152) or an encrypted data stream (e.g., 154). The data set or data stream may be encrypted with fully HE or non-fully HE. The non-fully HE may include encryption types of partially HE, somewhat HE, and leveled fully HE. The data application 244 may encrypt all parts of the data set with one type of HE, for example fully HE. The data application 244 may encrypt each part of the encrypted data set 152 with a different encryption method, a non-homomorphic encryption, or no encryption. Likewise, the encrypted data stream 154 may be encrypted with fully HE or non-fully HE. The non-fully HE may include encryption types of partially HE, somewhat HE, and leveled fully HE. The data application 244 may encrypt all of the data stream (e.g., 154) with one type of HE, for example fully HE. The data application 244 may encrypt each part of the encrypted data stream 154 with a different encryption method, a non-homomorphic encryption, or no encryption. Each part (e.g., 154A, 154B, 154C, 154D, 154E, and 154F) of the data stream may be encrypted with the same encryption key. Alternatively, each part of the data stream may be encrypted with different encryption keys. For example, the header 154A may be encrypted with a first encryption key, the user identification 154B may be encrypted with a second encryption key, the data file 154C may be encrypted with a third encryption key, and the end file 154F may be encrypted with a fourth encryption key. The HE encryption may use a public encryption key, a private encryption key, or any combination thereof. The encrypted data stream 154 or the encrypted data set 152 may include time sensitive data collected from an AV such as operational conditions alerting other AVs to an accident.

The AV 238 may transmit an encrypted data stream 154 to a transfer application (e.g., node application 124) executing on a VN 123 on the MDC node 120. The transfer application 124 can examine the encrypted data stream 154 to determine if the data stream is encrypted, if the data stream has some non-encrypted parts, or if the data stream has different encryptions methods applied to parts of the data stream. The transfer application 124 can determine a data characteristic of the encrypted data stream 154 by performing one or more mathematical operations or Boolean operations on the encrypted data stream 154. The transfer application 124 may analyze a part of the encrypted data stream 154 (e.g., the header 154A). The transfer application 124 can determine where to process the encrypted data stream 154 based on the type of data that has been encrypted. For example, if the encrypted data stream 154 is determined to be non-low latency data type that will be for storage or non-time sensitive processing, the managing application 124 may transfer the encrypted data stream 154 to a third transfer application (e.g., 166A) on network slice 140 on the 5G core network 136 as shown in FIG. 1. The transfer of non-low latency data away from the MDC node 120 and 5G edge site 126 may lower the volume of data traffic in the MDC node 120 and lower the latency and improve QoS. If the encrypted data stream 154 is determined to be time sensitive but non-low latency data, the transfer application 124 may transfer the encrypted data stream 154 to a second transfer application (e.g., 164A) on network slice 130 on the 5G edge site 126 for processing. The transfer of non-low latency data away from the MDC node 120 may lower the volume of data traffic and lower the latency. If the transfer application 124 determines the encrypted data stream 154 is low latency data (e.g., dangerous condition alerts), the transfer application 124 can process the encrypted data stream 154 and transmit the process data to a second AV, a plurality of AVs, or transmit the processed data stream to another application (e.g., remote application 164A on VNF 158).

In an embodiment, the AV 238 may transmit an encrypted data set 152 to the transfer application 124 executing on a VN 123 of the MDC node 120. The transfer application 124 can process the encrypted data set 152 in the same manner as previously described. The transfer application 124 can transfer non-low latency data to a third transfer application on network slice 140 on the 5G core network 136 as shown in FIG. 1. The transfer of non-low latency data away from the MDC node 120 and 5G edge site 126 may lower the volume of data traffic in the MDC node 120 and lower the latency and improve QoS. If the encrypted data set 152 is determined to be time sensitive but non-low latency data, the managing application 124 may transfer the encrypted data set 152 to a second transfer application (e.g., 164A) on network slice 130 on the 5G edge site 126 for processing. If the managing application 124 determines the encrypted data set 152 is low latency data (e.g., interactive), the managing application 124 can process the encrypted data set 152 and transmit the process data back to the AV 238, to another AV, to a plurality of AVs, or transmit the processed data set to another application (e.g., remote application 164A on VNF 158).

Figure 7:
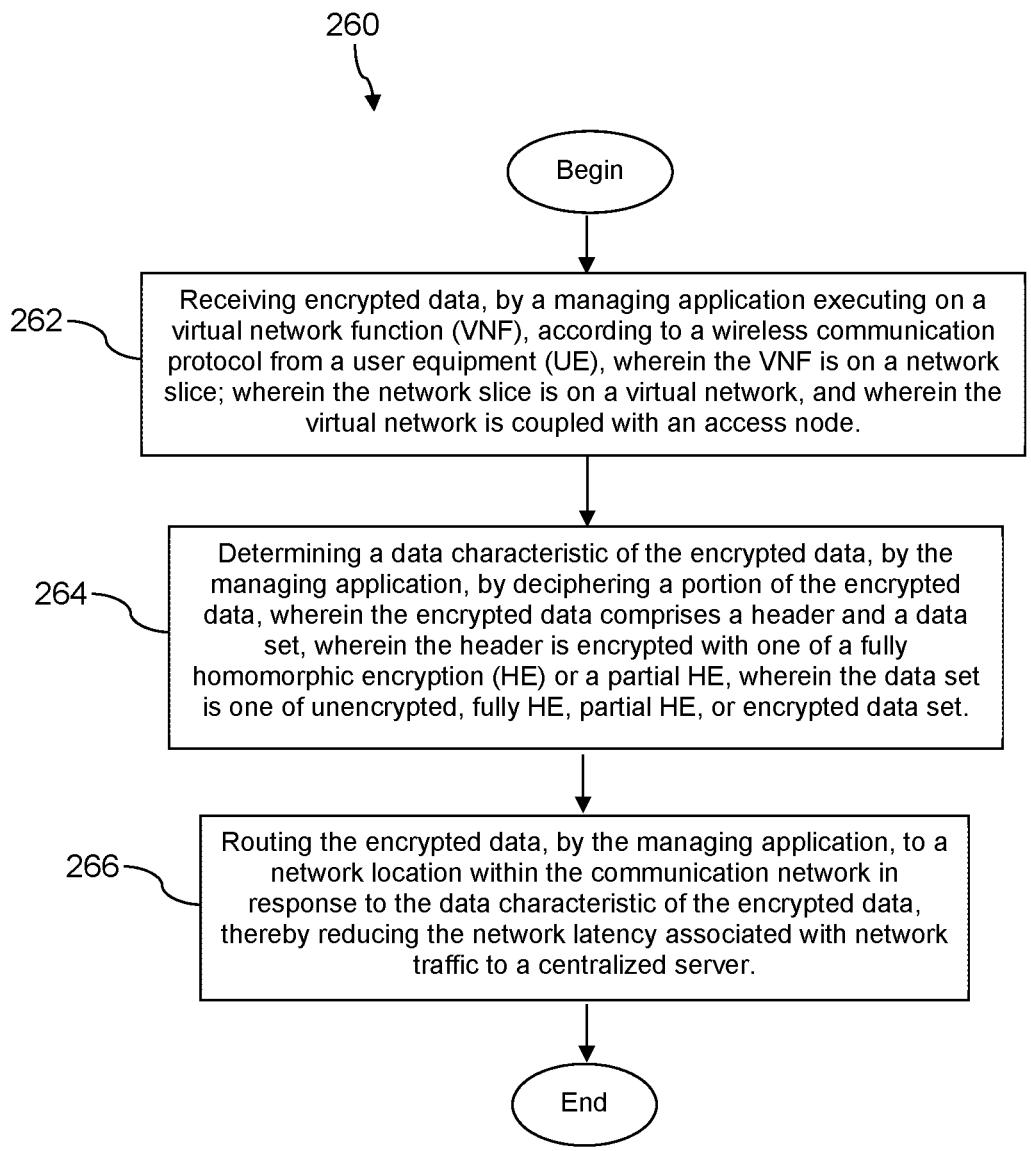
FIG. 7 is a flow chart of a method according to an embodiment of the disclosure.

Turning now to FIG. 7, a method 260 is described. In an embodiment, the method 260 is a method of directing encrypted data transmitted on a communication network. At block 262, the method 260 comprises receiving encrypted data, by a managing application executing on a virtual network function (VNF), according to a wireless communication protocol from a user equipment (UE), wherein the VNF is on a network slice; wherein the network slice is on a virtual network, and wherein the virtual network is coupled with an access node. At block 264, the method 260 comprises determining a data characteristic of the encrypted data, by the managing application, by deciphering a portion of the encrypted data, wherein the encrypted data comprises a header and a data set, wherein the header is encrypted with one of a fully HE or a non-fully HE, wherein the data set is one of unencrypted, fully HE, non-fully HE, or encrypted data set. At block 266, the method 260 comprises routing the encrypted data, by the managing application, to a network location within the communication network in response to the data characteristic of the encrypted data, whereby to reduce the network latency associated with network traffic to a centralized server.

Figure 8A:
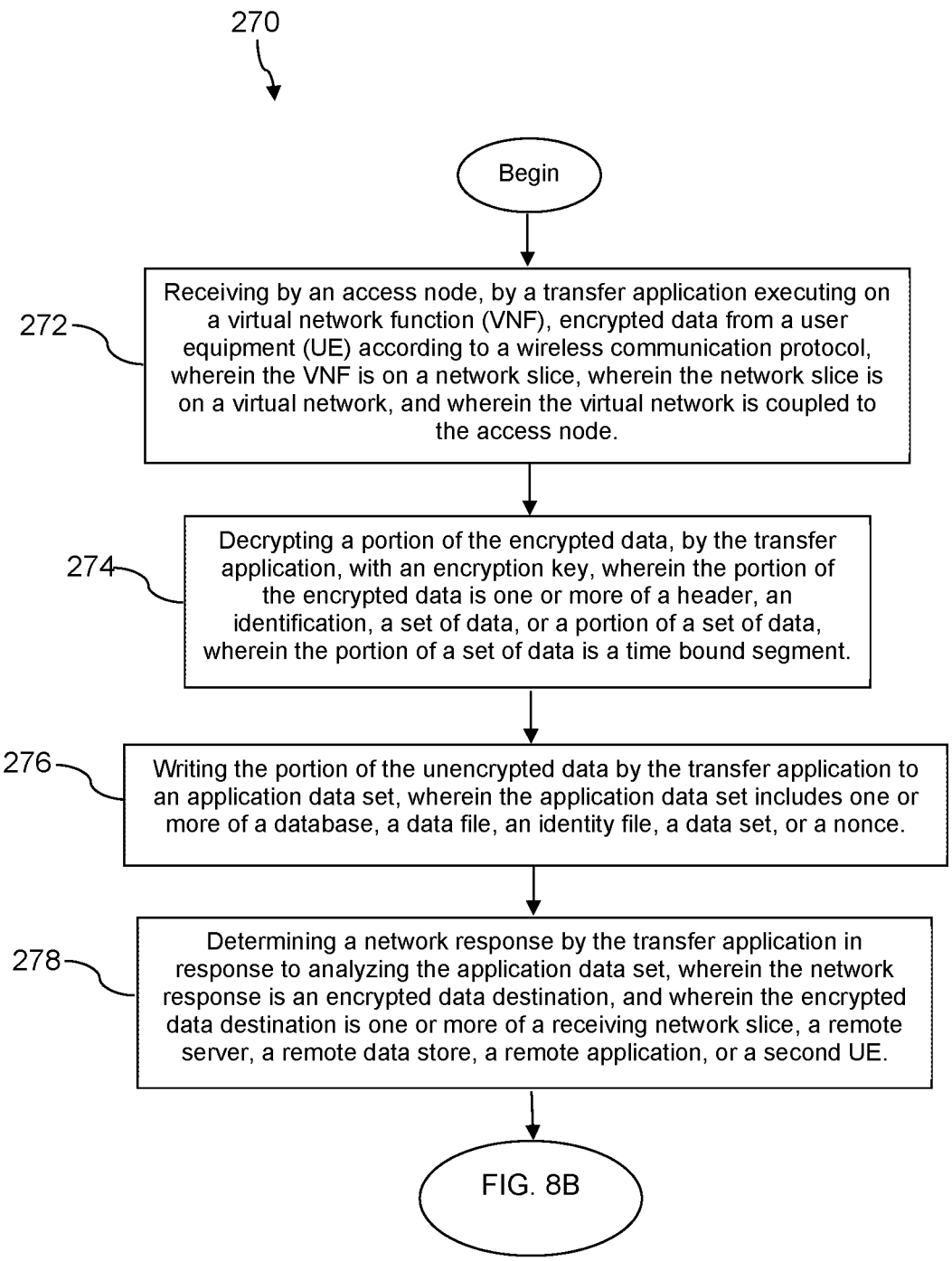
FIG. 8A is a flow chart of another method according to an embodiment of the disclosure.
Figure 8B:
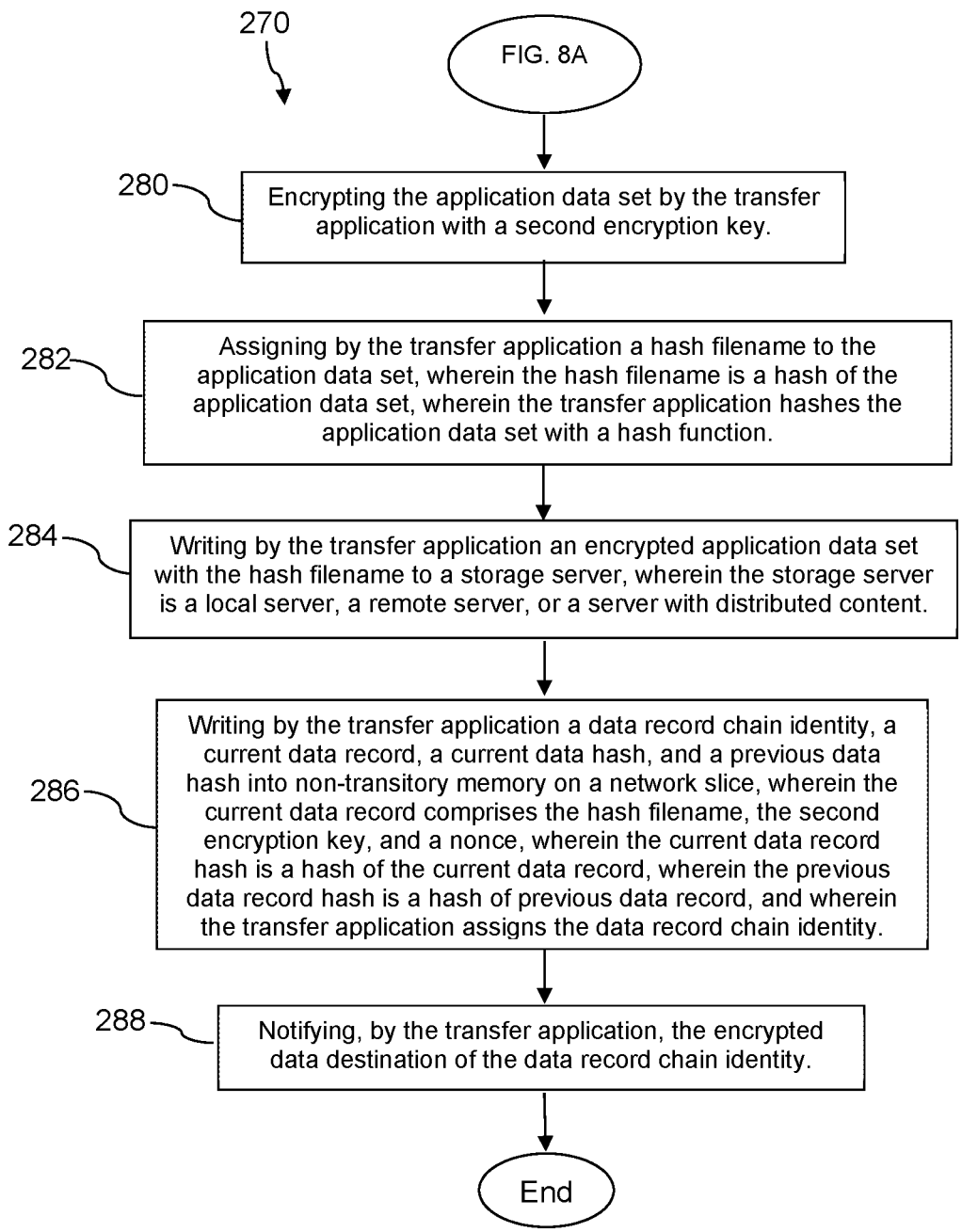
FIG. 8B is a continuation of a flow chart of another method according to an embodiment of the disclosure.

Turning now to FIG. 8A and FIG. 8B, a method 270 is described. In an embodiment, the method 270 is a method of secure transfer of encrypted data within a communication network from a network node. At block 272, the method 270 comprises receiving by an access node, by a transfer application executing on a virtual network function (VNF), encrypted data from a user equipment (UE) according to a wireless communication protocol, wherein the VNF is on a network slice, wherein the network slice is on a virtual network, and wherein the virtual network is coupled to the access node.

At block 274, the method 270 comprises decrypting a portion of the encrypted data, by the transfer application, with an encryption key, wherein the portion of the encrypted data is one or more of a header, an identification, a set of data, or a portion of a set of data, wherein the portion of a set of data is a time bound segment. At block 276, the method 270 comprises writing the portion of the unencrypted data by the transfer application to an application data set, wherein the application data set includes one or more of a database, a data file, an identity file, a data set, or a nonce. At block 278, the method 270 comprises determining a network response by the transfer application in response to analyzing the application data set, wherein the network response is an encrypted data destination and wherein the encrypted data destination is one or more of a receiving network slice, a remote server, a remote data store, a remote application, or a second UE.

At block 280, the method 270 comprises encrypting the application data set, by the transfer application, with a second encryption key. At block 282, the method 270 comprises assigning, by the transfer application, a hash filename to the application data set, wherein the hash filename is a hash of the application data set, wherein the transfer application hashes the application data set with a hash function.

At block 284, the method 270 comprises writing by the transfer application an encrypted application data set with the hash filename to a storage server, wherein the storage server is a local server, a remote server, or a server with distributed content. At block 286, the method 270 comprises writing by the transfer application a data record chain identity, a current data record, a current data hash, and a previous data hash into non-transitory memory on a network slice, wherein the current data record comprises the hash filename, the second encryption key, and a nonce, wherein the current data record hash is a hash of the current data record, wherein the previous data record hash is a hash of previous data record, and wherein the transfer application assigns the data record chain identity.

At block 288, the method 270 comprises notifying, by the transfer application, the encrypted data destination of the data record chain identity.

Figure 9:
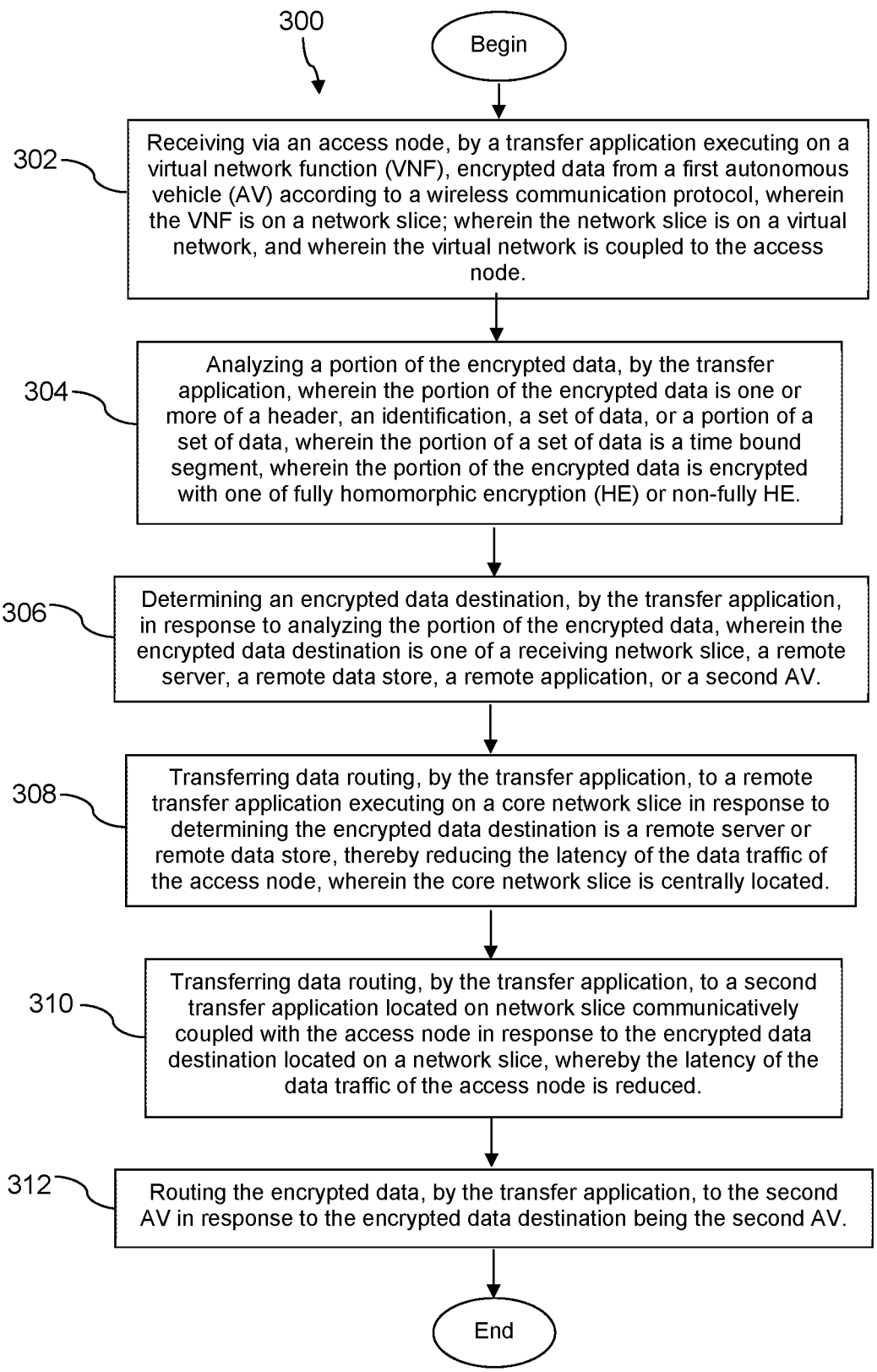
FIG. 9 is a flow chart of yet another method according to an embodiment of the disclosure.

Turning now to FIG. 9, a method 300 is described. In an embodiment, the method 300 is a method of secure transfer of encrypted data from a first autonomous vehicle (AV) to a second AV within a communication network. At block 302, the method 300 comprises receiving via an access node, by a transfer application executing on a virtual network function (VNF) encrypted data from a first autonomous vehicle (AV) according to a wireless communication protocol, wherein the VNF is on a network slice; wherein the network slice is on a virtual network, and wherein the virtual network is coupled to the access node.

At block 304, the method 300 comprises analyzing a portion of the encrypted data, by the transfer application, wherein the portion of the encrypted data is one or more of a header, an identification, a set of data, or a portion of a set of data, wherein the portion of a set of data is a time bound segment and wherein the portion of the encrypted data is encrypted with one of fully homomorphic encryption (HE) or partially HE.

At block 306, the method 300 comprises determining an encrypted data destination, by the transfer application, in response to analyzing the portion of the encrypted data, wherein the encrypted data destination is one of a receiving network slice, a remote server, a remote data store, a remote application, or a second AV.

At block 308, the method 300 comprises transferring data routing, by the transfer application, to a remote transfer application executing on a core network slice in response to determining the encrypted data destination is a remote server or remote data store, thereby reducing the latency of the data traffic of the access node, wherein the core network slice is centrally located. At block 310, the method 300 comprises transferring data routing by the transfer application to a second transfer application located on network slice communicatively coupled with the access node in response to the encrypted data destination located on a network slice, whereby a latency of the data traffic of the access node is reduced. At block 312, the method 300 comprises routing the encrypted data, by the transfer application, to the second AV in response to the encrypted data destination being the second AV.

Figure 10:
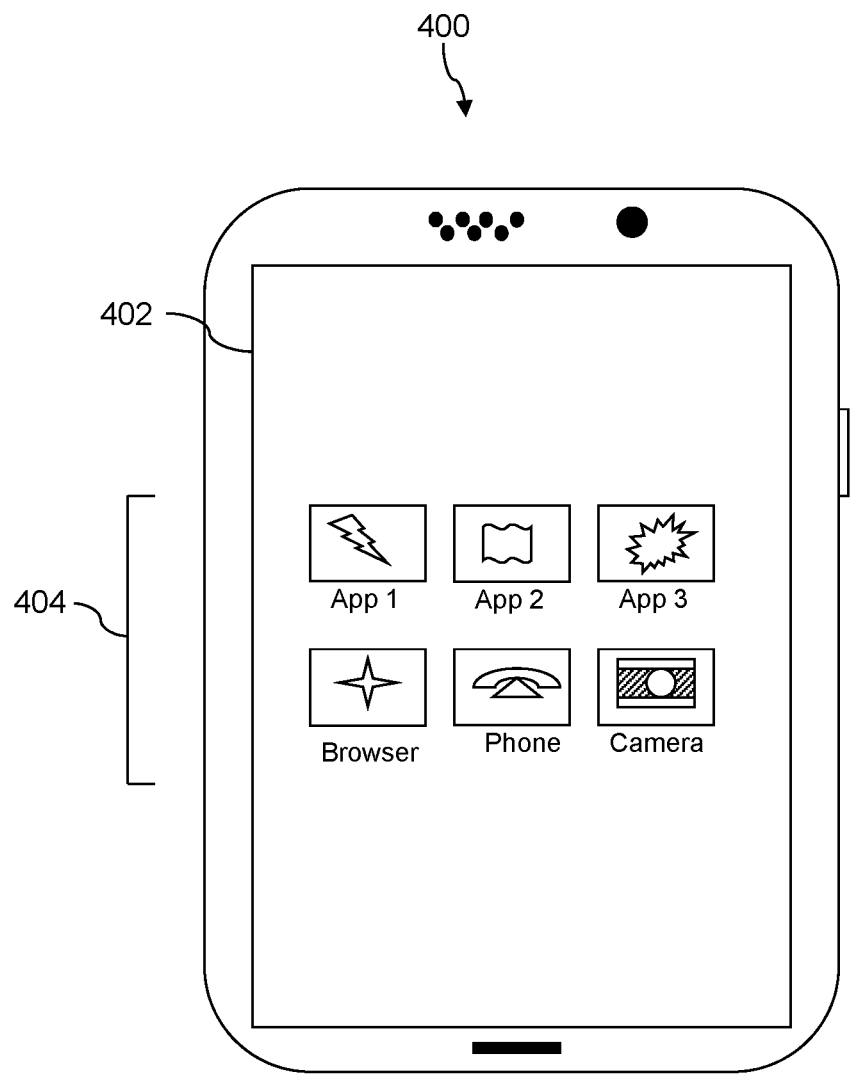
FIG. 10 is an illustration of a mobile communication device according to an embodiment of the disclosure.

FIG. 10 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 11:
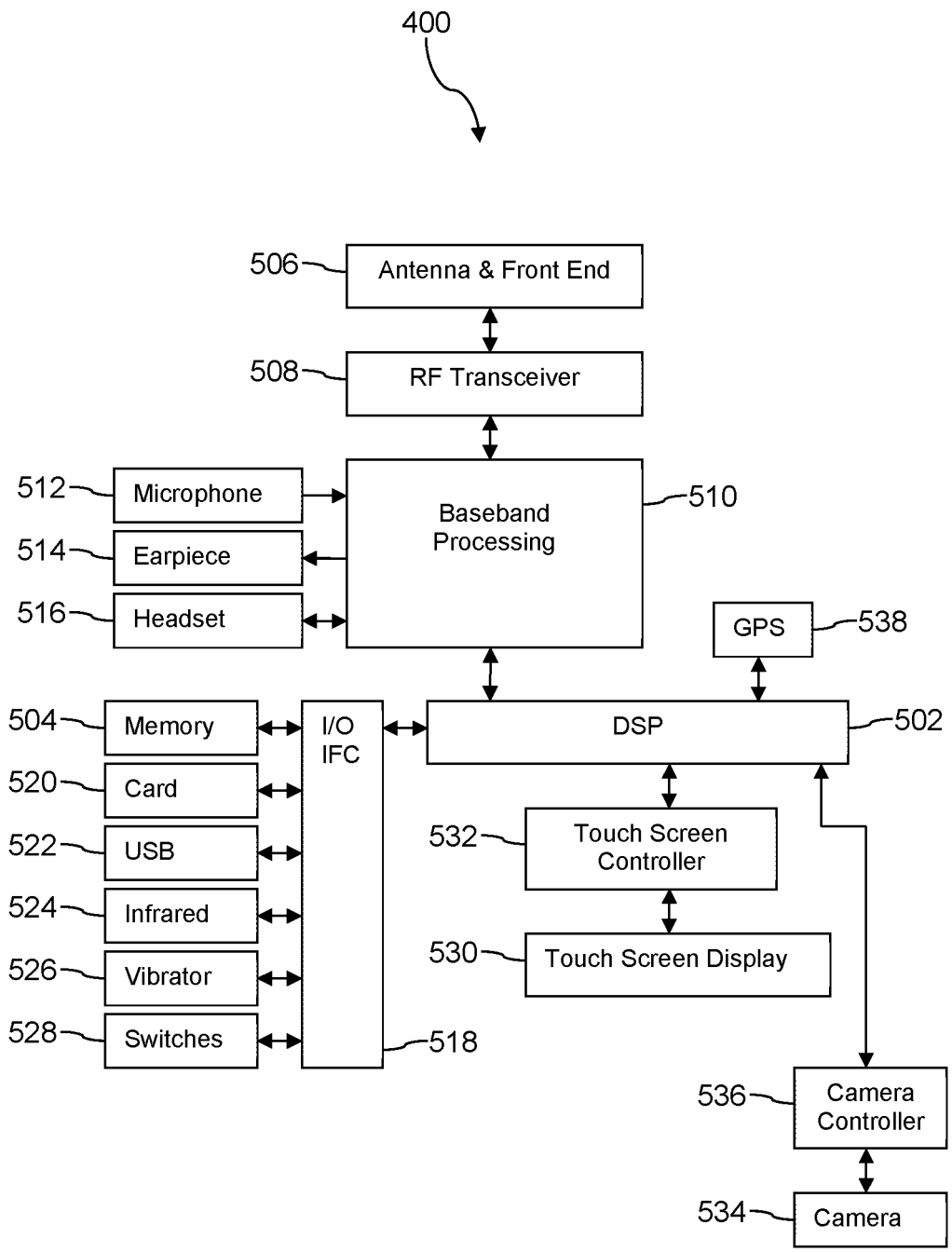
FIG. 11 is a block diagram of a hardware architecture of a mobile communication device according to an embodiment of the disclosure.

FIG. 11 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an Institute of Electrical and Electronics Engineers (IEEE) 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen liquid crystal display (LCD) controller 532 couples the DSP 502 to the touch screen display 530. The GPS receiver 538 is coupled to the DSP 502 to decode global positioning system signals, thereby enabling the UE 400 to determine its position.

Figure 12A:
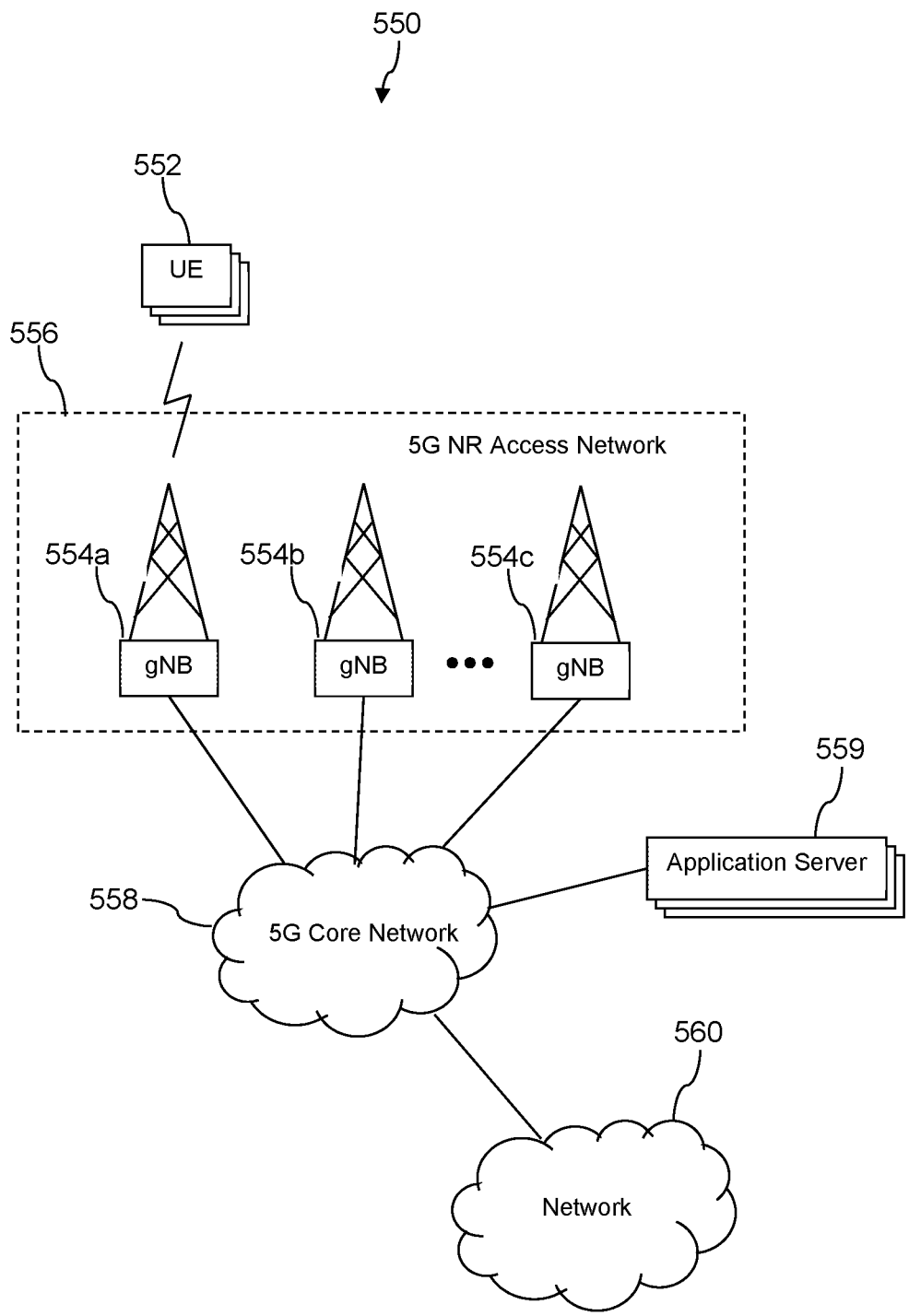
FIG. 12A is a block diagram of an exemplary communication system according to an embodiment of the disclosure.

With reference to FIG. 1 and FIG. 6, disclosed herein is a communication system for receiving and processing of voice and data communications. Turning now to FIG. 12A, an exemplary communication system 550 is described. Typically, the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In Fourth Generation (4G) technology (e.g., long term evolution (LTE) technology) an access node 554 may be referred to as an enhanced Node B (eNB). In 3G technology (e.g., code division multiple access (CDMA) and global system for mobile communication (GSM)) an access node 554 may be referred to as a base transceiver station (BTS) combined with a basic station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from First Generation "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (loT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (loT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 12B:
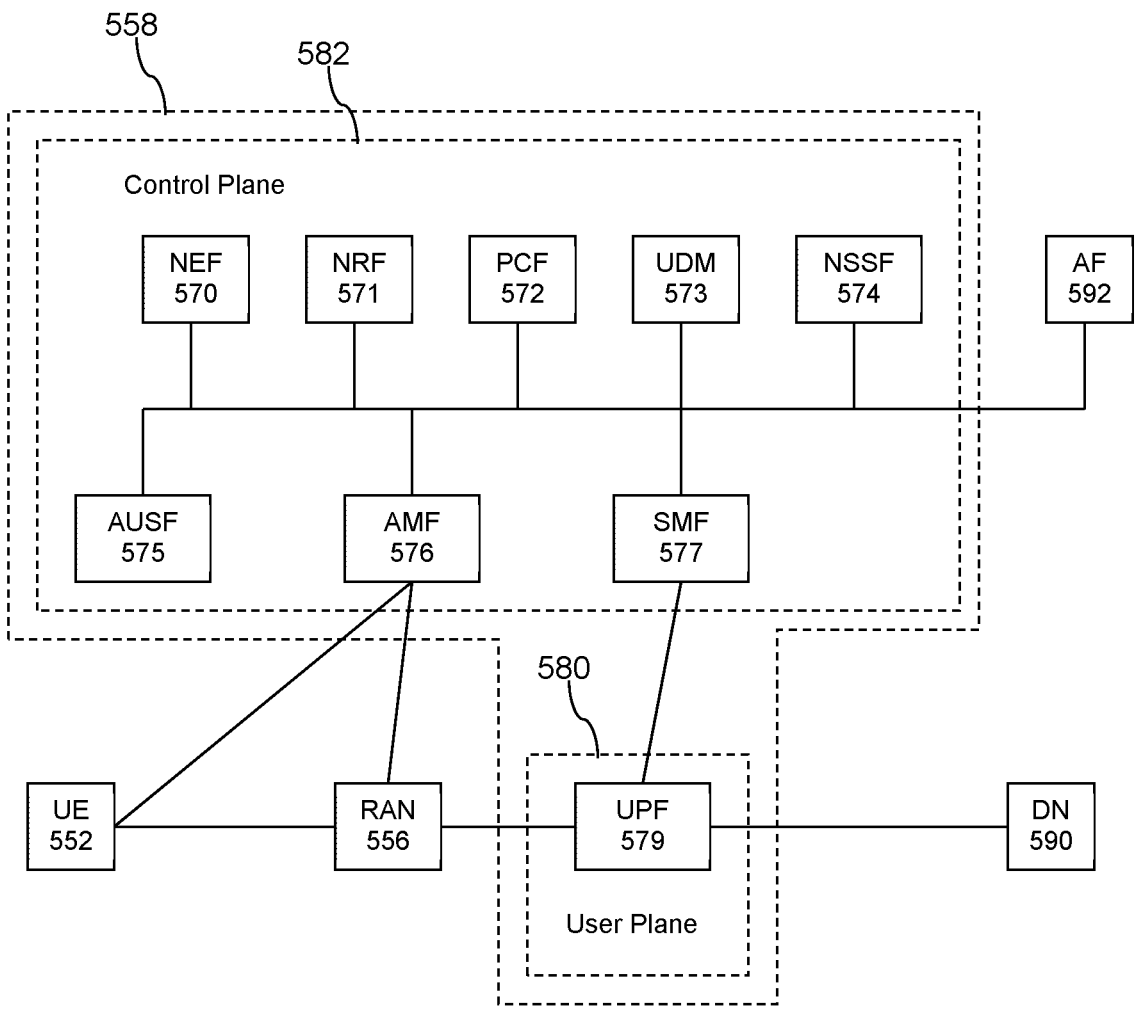
FIG. 12B is a block diagram of a 5G core network according to an embodiment of the disclosure.

Turning now to FIG. 12B, further details of the core network 558 are described. In an embodiment, the core network 558 is a 5G core network. 5G core network technology is based on a service based architecture paradigm. Rather than constructing the 5G core network as a series of special purpose communication nodes (e.g., a Home Subscriber Server (HSS) node, a Mobility Management Entity (MME) node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 6A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 13:
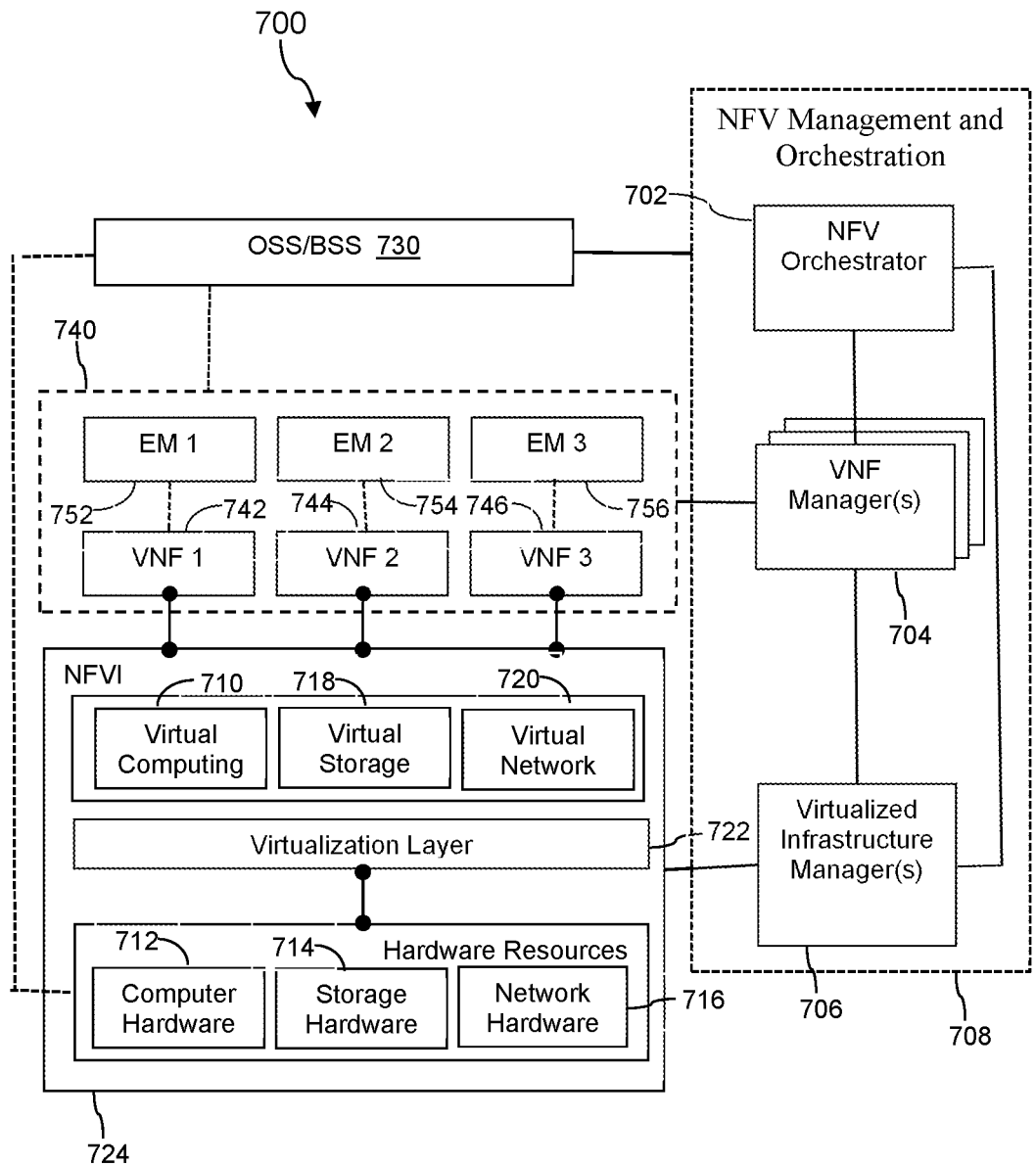
FIG. 13 is a block diagram of a network function virtualization according to an embodiment of the disclosure.

FIG. 13 illustrates an NFV system 700 for use in various embodiments of the disclosed systems and methods. NFV system architecture is well understood and described in Network Functions Virtualization (NFV); Architectural Framework ETSI GS NFV 002 V1.2.1 (2014-12), which is incorporated into this description. The NFV system 700 can comprise an NFV Infrastructure (NFVI) entity 724, a virtual function entity 740, NFV Management and Orchestration 708, and an Operations Support Systems (OSS) and Business Support Systems (BSS) generally referred to as OSS/BSS 730 suitable for implementing one or more embodiments disclosed herein.

The NFVI 724 is the hardware and software components that comprise the environment in which VNFs (e.g., VNF 742, 744, and 746) are deployed, managed, and executed. The NFVI 724 can be located in one location or can be communicatively connected to multiple locations. For example, the NFVI 724 can be located on several floors of a building or across several buildings on campus. The network providing connectivity between those locations comprises part of the NFV Infrastructure. The NFVI 724 includes off-the-shelf (OTS) hardware resources of computing hardware 712, storage hardware 714, and network hardware 716. The computing hardware 712 can be OTS instead of purpose-built hardware. The storage hardware 714 can comprise network attached storage (NAS) and storage that resides on the computing hardware 712. The storage hardware 714 can include standard hard-drives, solid-state drives, optical storage devices, or any combination thereof. Network hardware 716 is comprised of switching functions, e.g., routers, and wired or wireless links. Network hardware 716 can also provide resources that span different domains. In NFVI 724, the computing hardware 712, storage hardware 714, and network hardware 716 are pooled together through the virtualization layer 722 (e.g., hypervisor).

The virtualization layer 722 within the NFVI 724 can abstract the computing hardware 712, storage hardware 714, and network hardware 716 and decouple the VNF functions 742, 744, and 746 from the computing hardware 712, storage hardware 714, and network hardware 716. For example, the virtualization layer 722 may be responsible for abstracting and logically partitioning computer the computing hardware 712, storage hardware 714, and network hardware 716, enabling the software that implements the VNF functions to use the underlying virtualized infrastructure, and providing virtualized resources to each of the VNF functions 742, 744, and 746. The virtualized resources controlled by the virtualization layer 722 may include a virtual computing 710, a virtual storage 718, and a virtual network 720.

The NFV Management and Orchestration 708 can manage the operation and coordination of VNF function 742, 744, and 746 and the respective NFVI entity 724. The NFV Management and Orchestration 708 can comprise an NFV Orchestrator (NFVO) 702, one or more VNF managers (VNFM) 704, and one or more Virtualized Infrastructure Manager (VIM) 706. The NFVO 702 can manage the network service (NS) lifecycle and coordinates the management of the NS lifecycle, VNF lifecycle through the VNFM 704, and NFVI resources through the VIM 706. The NFVO 702 operates to ensure the allocation of the necessary resources and connectivity for the VNF functions 742, 744, and 746 is optimized. The VNFM 704 can coordinate the VNF function 742, 744, and 746 lifecycle management (e.g., initiation, update, scaling, and termination). For example, in some configurations a separate VNFM 704 may be deployed for each VNF function 742, 744, and 746. In other configurations, a VNFM 704 may serve multiple VNF functions 742, 744, and 746. The VIM 706 can control and manage the NFVI 724 hardware resources. In other words, the VIM 706 can control and manage the virtualization layer 722 to provide virtual computing 710, virtual storage 718, and virtual network 720 resources to the VNF functions 742, 744, and 746 from the computer hardware 712, storage hardware 714, and network hardware 716. The VIM 706 and the VNFM 704 may coordinate to provide the resource allocation to the VNF functions 742, 744, and 746 by modifying the virtualized hardware resource configuration and state information.

The OSS/BSS 730 can coordinate the communication between NFV management and orchestration 708, NFVI 724, and virtual function entity 740. The OSS/BSS 730 can communicate the computing capacity of the NFVI 724 to VNFM 704 and VIM 706 within NFV management and orchestration 708. The OSS/BSS can coordinate the lifecycle management of the VNF functions 742, 744, and 746 with the NFVI 724 and the VNFM 704.

The virtual function entity 740 can comprise a plurality of VNF functions 742, 744, and 746, a plurality of element management (EM) systems 752, 754, and 756 that can be configured to perform the typical management functionality for the plurality of VNF functions 742, 744, and 746. Although three VNF and EMS systems are illustrated in FIG. 10, any number of these functions and systems may be found virtual function entity 740. It is also understood that alternate configurations of the VNF functions and element management systems may be contemplated within ETSI GS NFV 002 V1.2.1 (2014-12).

The VNF functions 742, 744, and 746 can be a virtualization of a network function in a non-virtualized network. For example, the network functions in the non-virtualized network may be 3GPP Evolved Packet Core (EPC) network elements, e.g., Mobility Management Entity (MME), Serving Gateway (SGW), Packet Data Network Gateway (PGW); elements in a home network, e.g., Residential Gateway (RGW); and conventional network functions, e.g., Dynamic Host Configuration Protocol (DHCP) servers, firewalls, etc. For example, NFV 700 can be comprised of one or more internal components, called virtualized network function components (VNFCs). Each VNFC provides a defined sub-set of that VNF's functionality, with the main characteristic that a single instance of this component maps one-for-one against a single virtualization container. For example, one VNF can be deployed over multiple Virtual Machines (VMs), where each VM hosts a VNFC of the VNF. However, in some cases, the whole VNF can be deployed in a single VM as well. A VM may be virtualized computation environment that behaves like a physical computer or server, which has all its ingredients (processor, memory/storage, interfaces/ports) of a physical computer/server and is generated by a hypervisor, which partitions the underlying physical resources and allocates them to VMs. A hypervisor may be a piece of software which partitions the underlying physical resources and creates virtual machines and isolates the virtual machines from each other.

Figure 14A:
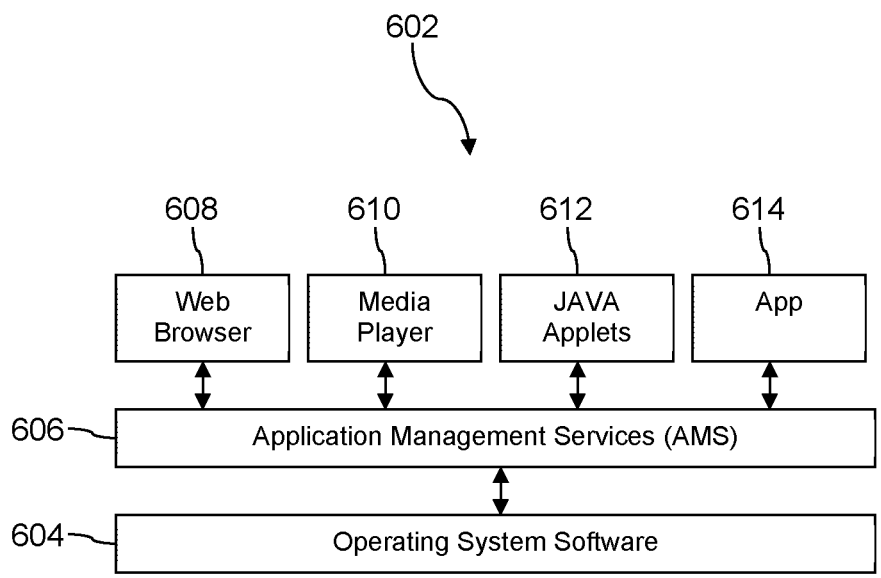
FIG. 14A is a block diagram of a software architecture of a mobile communication device according to an embodiment of the disclosure.

FIG. 14A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, JAVA applets 612, and other applications 614. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 14B:
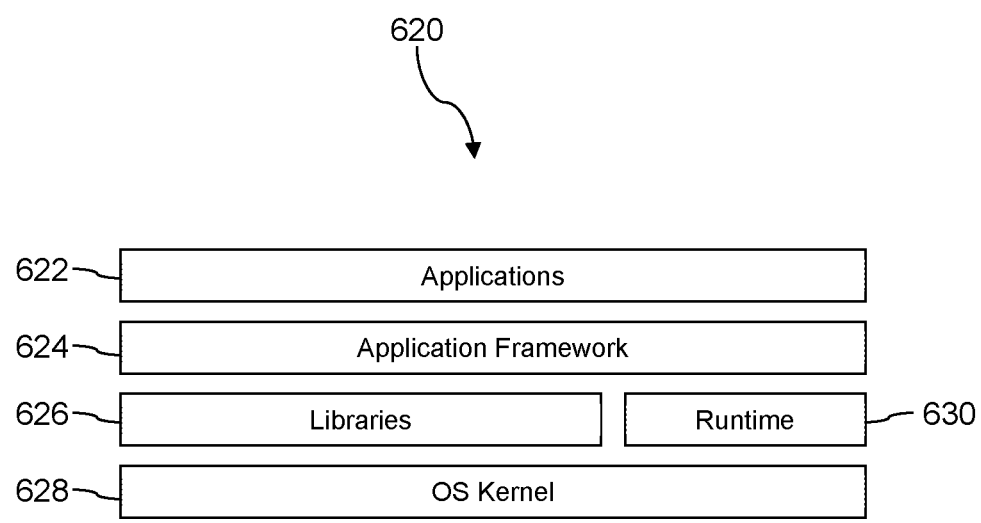
FIG. 14B is a block diagram of another software architecture of a mobile communication device according to an embodiment of the disclosure.

FIG. 14B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 15:
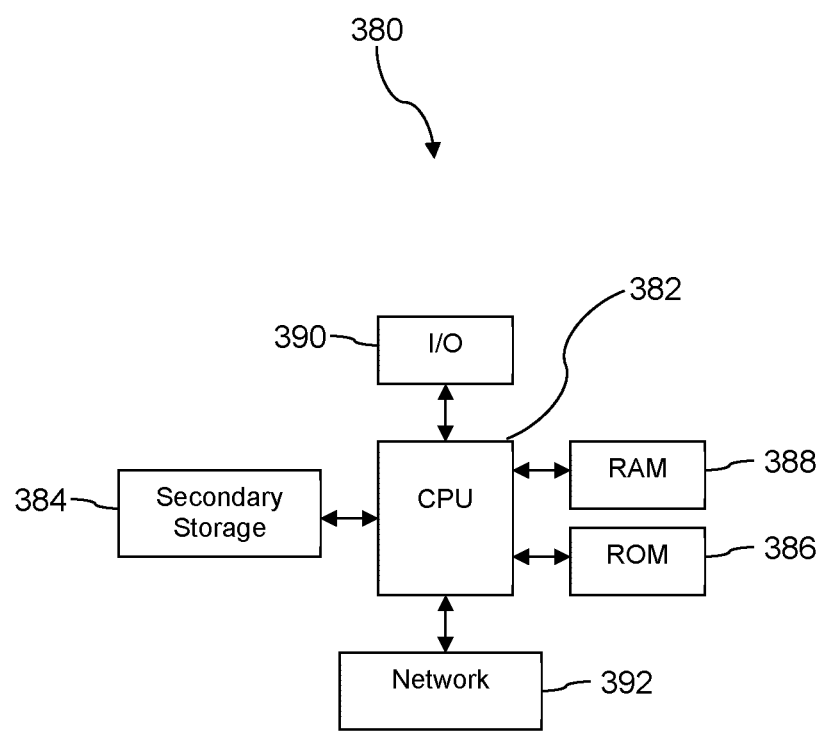
FIG. 15 is a block diagram of a computer system according to an embodiment of the disclosure.

FIG. 15 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of directing encrypted data wirelessly transmitted on a communication network, comprising:
    receiving encrypted data, by a managing application executing on a virtual network function (VNF), according to a wireless communication protocol from a user equipment (UE), wherein the VNF is on a network slice, wherein the network slice is on a virtual network, and wherein the virtual network is coupled with an access node;
    determining a data characteristic of the encrypted data by the managing application by deciphering a portion of the encrypted data, wherein the encrypted data comprises a header and a data set, wherein the header is encrypted with one of a fully homomorphic encryption (HE) or a non-fully HE, wherein the data set is one of unencrypted, fully HE, non-fully HE, or non-HE encrypted data set; and
    routing the encrypted data by the managing application to a network location within the communication network in response to the data characteristic of the encrypted data, whereby to reduce a network latency associated with network data traffic to a centralized server.

2. The method of claim 1, wherein:
    the network location is one of i) a VNF on a network slice within a 5G core network, ii) a VNF on a network slice within a 5G mini data center (MDC) communicatively coupled with an access network, iii) a VNF on a network slice within an MDC coupled to the access node, or iv) a remote UE communicatively coupled to the access node.

3. The method of claim 2, wherein the network location includes any combination of a remote application, a database, a storage device, or a distributed storage system.

4. The method of claim 1, wherein:
    the encrypted data is one of a data stream or a static set of data, wherein the static set of data is one of a data set, a database, a data file, or an array of data.

5. The method of claim 1, wherein:
    the header comprises an encryption identifier, an address, a UE identification, a user identification, and a data type.

6. The method of claim 1, wherein the non-fully HE is one of partially HE, somewhat HE, and leveled fully HE.

7. The method of claim 1, wherein the data characteristic is one or both a type of the encrypted data and a latency of the encrypted data.

8. The method of claim 1, wherein the UE is one of a computing device, a cell phone, a smartphone, a wearable computer, a smartwatch, a headset computer, a laptop computer, a tablet computer, a notebook computer, a virtual home assistant, an internet of things (IoT) device, a smart speaker, a personal digital assistant, a home video conferencing device, a home monitoring device, a gaming device, a virtual reality headset, an immersive reality headset, or a gaming platform.

9. The method of claim 1, wherein the managing application decrypts a first portion of the encrypted data with a first encryption key and a second portion of the encrypted data with a second encryption key, wherein the first and second encryption keys are one of the same or different.

10. A method of secure transfer of encrypted data within a communication network from a network node, comprising:
    receiving by an access node, by a transfer application executing on a virtual network function (VNF), encrypted data from a user equipment (UE) according to a wireless communication protocol, wherein the VNF is on a network slice, wherein the network slice is on a virtual network, and wherein the virtual network is coupled to the access node;
    decrypting a portion of the encrypted data by the transfer application with an encryption key, wherein the portion of the encrypted data is one or more of a header, an identification, a set of data, or a portion of a set of data, wherein the portion of a set of data is one of a time bound segment or a set bound segment;
    writing the decrypted portion of the unencrypted data by the transfer application to an application data set, wherein the application data set includes one or more of a database, a data file, an identity file, a data set, or a nonce;
    determining a network response by the transfer application in response to analyzing the application data set, wherein the network response is an encrypted data destination and wherein the encrypted data destination is one or more of a receiving network slice, a remote server, a remote data store, a remote application, or a second UE;
    encrypting the application data set by the transfer application with a second encryption key;
    assigning by the transfer application a hash filename to the application data set, wherein the hash filename is a hash of the application data set and wherein the transfer application hashes the application data set with a hash function;
    writing by the transfer application an encrypted application data set with the hash filename to a storage server, wherein the storage server is a local server, a remote server, or a server with distributed content;
    writing by the transfer application a data record chain identity, a current data record, a current data hash, and a previous data hash into non-transitory memory on a network slice, wherein the current data record comprises the hash filename, the second encryption key, and a nonce, wherein the current data record hash is a hash of the current data record, wherein the previous data record hash is a hash of previous data record, and wherein the transfer application assigns the data record chain identity; and
    notifying by the transfer application the encrypted data destination of the data record chain identity.

11. The method of claim 10, wherein the hash of the previous data record is the hash of an application data set from a previous portion of the encrypted data, wherein the current data record is sequential to the previous data record.

12. The method of claim 10, wherein the encrypted data destination is any combination of a remote application, a database, a storage device, or a distributed storage system.

13. The method of claim 10, wherein the encryption key is a public encryption key.

14. The method of claim 10, wherein the UE is one of a computing device, a cell phone, a smartphone, a wearable computer, a smartwatch, a headset computer, a laptop computer, a tablet computer, a notebook computer, a virtual home assistant, an internet of things loT device, a smart speaker, a personal digital assistant, a home video conferencing device, a home monitoring device, a gaming device, a virtual reality headset, an immersive reality headset, or a gaming platform.

15. The method of claim 10, wherein the transfer application decrypts a first portion of the encrypted data and a second portion of the encrypted data with the same encryption key or different encryption keys.

16. A method of secure transfer of encrypted data from a first autonomous vehicle (AV) to a second AV within a communication network, comprising:
    receiving via an access node, by a transfer application executing on a virtual network function (VNF), encrypted data from a first autonomous vehicle (AV) according to a wireless communication protocol, wherein the VNF is on a network slice, wherein the network slice is on a virtual network, and wherein the virtual network is coupled to the access node;
    analyzing a portion of the encrypted data by the transfer application, wherein the portion of the encrypted data is one or more of a header, an identification, a set of data, or a portion of a set of data, wherein the portion of a set of data is a time bound segment and wherein the portion of the encrypted data is encrypted with one of fully homomorphic encryption (HE) or non-fully HE;
    determining an encrypted data destination by the transfer application in response to analyzing the portion of the encrypted data, wherein the encrypted data destination is one of a receiving network slice, a remote server, a remote data store, a remote application, or a second AV;
    transferring data routing by the transfer application to a remote transfer application executing on a core network slice in response to determining the encrypted data destination is a remote server or remote data store, thereby reducing a latency of data traffic of the access node, wherein the core network slice is centrally located;
    transferring data routing by the transfer application to a second transfer application located on network slice communicatively coupled with the access node in response to the encrypted data destination located on a network slice, whereby a latency of the data traffic of the access node is reduced; and
    routing the encrypted data, by the transfer application, to the second AV in response to the encrypted data destination being the second AV.

17. The method of claim 16, wherein analyzing the encrypted data comprises deciphering the homomorphic encryption to determine a nature of the data, wherein the nature of the data comprises the type of the encrypted data, the identity, or the latency of the encrypted data.

18. The method of claim 16, wherein the non-fully HE is one of partially HE, somewhat HE, and leveled fully HE.

19. The method of claim 16, wherein the AV is one of a self-driving vehicle, a driver assisted vehicle, or an application that automates emergency braking.

20. The method of claim 16, the transfer application decrypts a first portion of the encrypted data with a first encryption key and a second portion of the encrypted data with a second encryption key, wherein the first and second encryption keys are one of the same or different.

* * * * *